United States Patent
Ito et al.

(10) Patent No.: US 6,935,126 B2
(45) Date of Patent: Aug. 30, 2005

(54) REFRIGERATION CYCLE SYSTEM

(75) Inventors: Shigeki Ito, Okazaki (JP); Yoshiaki Takano, Kosai (JP); Teruyuki Hotta, Nagoya (JP); Yasushi Yamanaka, Nakashima-gun (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/729,219

(22) Filed: Dec. 5, 2003

(65) Prior Publication Data
US 2004/0112073 A1 Jun. 17, 2004

(30) Foreign Application Priority Data
Dec. 6, 2002 (JP) .................................... 2002-355835

(51) Int. Cl.⁷ ................... F25B 41/00; F25B 49/00; F25B 41/04
(52) U.S. Cl. .................... 62/196.4; 62/222; 62/513
(58) Field of Search ................ 62/113, 196.4, 62/222, 224, 225, 513

(56) References Cited

U.S. PATENT DOCUMENTS

| | | | | |
|---|---|---|---|---|
| 3,638,446 A | * | 2/1972 | Palmer ................ | 62/202 |
| 5,415,008 A | * | 5/1995 | Bessler ................ | 62/212 |
| 6,351,950 B1 | * | 3/2002 | Duncan ................ | 62/3.2 |
| 6,460,358 B1 | * | 10/2002 | Hebert ................ | 62/225 |
| 6,786,057 B2 | * | 9/2004 | Ben Yahia ............ | 62/222 |
| 2004/0244411 A1 | * | 12/2004 | Ichimura et al. ....... | 62/513 |

FOREIGN PATENT DOCUMENTS

JP 2001-277842 10/2001

* cited by examiner

Primary Examiner—Marc Norman
(74) Attorney, Agent, or Firm—Harness, Dickey & Pierce, PLC

(57) ABSTRACT

A refrigeration cycle for a vehicle air conditioning system allows the refrigerant-to-refrigerant heat exchanger to exchange heat between a high-pressure liquid refrigerant, which is delivered from the sub-cooling condenser and directed to the evaporator, and a low-pressure refrigerant having a liquid and gas phase, which is delivered from the evaporator and directed to the compressor. The refrigeration cycle also allows the amount of the refrigerant circulating through the refrigeration cycle to be adjusted in response to the level of sub-cooling upstream of a throttle hole of a reverse sub-cooling control valve to thereby indirectly control the level of superheating on the outlet side of the evaporator. This provides improvements both in the amount of heat to be exchanged between refrigerants in the refrigerant-to-refrigerant heat exchanger and the cooling performance of the evaporator.

19 Claims, 9 Drawing Sheets

REFRIGERATION CYCLE SYSTEM

CROSS REFERENCE TO RELATED APPLICATION

This application is based upon, claims the benefit of priority of, and incorporates by reference Japanese Patent Application No. 2002-355835 filed Dec. 6, 2002.

BACKGROUND OF THE INVENTION

1. Field of the Invention

The present invention relates to a refrigeration cycle system with a refrigerant-to-refrigerant heat exchanger that allows heat exchange between a high-pressure refrigerant drawn from a liquid refrigerant receiver and directed to a variable throttle valve and a low-pressure refrigerant delivered from a refrigerant evaporator and directed to a refrigerant compressor. In particular, the present invention relates to a refrigeration cycle system which can control the amount of refrigerant in response to the level of subcooling of a refrigerant delivered from the refrigerant-to-refrigerant heat exchanger.

2. Description of the Related Art

As shown in FIG. 10A, a conventionally known refrigeration cycle system has an annular refrigerant circuit through which a gaseous refrigerant discharged from a discharge port of a compressor 101 is circulated through a sub-cooling condenser 102, a temperature controlled expansion valve 104, and an evaporator 105 back to a suction port of the compressor 101. As shown in FIG. 10B, also suggested is a refrigeration cycle system with an annular refrigerant circuit through which a gaseous refrigerant discharged from the discharge port of the compressor 101 is circulated through the sub-cooling condenser 102, a double-pipe refrigerant-to-refrigerant heat exchanger 103, the temperature controlled expansion valve 104, and the evaporator 105 back to the suction port of the compressor 101 (e.g., Japanese Patent Laid-Open Publication No. 2001-277842, PP. 1 to 7 and FIGS. 1 to 8).

The sub-cooling condenser 102 is a refrigerant condenser integrated with a liquid refrigerant receiver, in which a refrigerant condenser 121 for condensing a refrigerant into a liquid refrigerant, a liquid refrigerant receiver 122 for separating a refrigerant into liquid and gaseous refrigerants, a subcooler 123 for subcooling a liquid refrigerant and the like are integrated in one piece. On the other hand, employed as the temperature controlled expansion valve 104 is a so-called block-type (or box-type) expansion valve having an expansion valve body and a temperature-sensitive cylinder 106 incorporated into a cubic block in which are defined a high pressure refrigerant passageway serving as an inlet passageway to the evaporator 105 and a low pressure refrigerant passageway serving as an outlet passageway from the evaporator 105.

This refrigeration cycle system allows the double-pipe refrigerant-to-refrigerant heat exchanger 103 to exchange heat between a high pressure refrigerant flowing through a first refrigerant conduit 111 disposed at some midpoint in the high pressure refrigerant conduit (high pressure liquid line) and a low pressure refrigerant flowing through a second refrigerant conduit 112 disposed at some midpoint in the low pressure refrigerant conduit (low pressure suction conduit). This allows the low pressure refrigerant in the low pressure refrigerant conduit to absorb heat from the high pressure refrigerant in the high pressure refrigerant conduit, thereby making it possible to further subcool the high pressure liquid refrigerant delivered from the sub-cooling condenser 102. This in turn enables the liquid refrigerant to be supplied with stability to the valve hole of the temperature controlled expansion valve 104, thereby improving the performance of cooling the passenger compartment.

On the other hand, the high-pressure refrigerant in the high-pressure refrigerant conduit is to heat the low pressure refrigerant in the low pressure refrigerant conduit, thereby allowing the low pressure gaseous refrigerant delivered from the evaporator 105 and directed to the compressor 101 to be evaporated by superheating. This in turn prevents the refrigerant from being compressed in the compressor 101 and improves the performance of cooling the passenger compartment.

However, the prior art refrigeration cycle system employs a typical temperature controlled expansion valve 104 connected between the double-pipe refrigerant-to-refrigerant heat exchanger 103 and the evaporator 105, in which the level of superheating (SH) of the refrigerant on the outlet side of the evaporator 105 is sensed with the temperature-sensitive cylinder 106 incorporated in the low pressure refrigerant passageway to adjust the area of opening (the degree of valve opening) or the degree of throttle opening of the valve hole in the temperature controlled expansion valve 104.

With this arrangement, a high-temperature low-pressure gaseous refrigerant, which has been evaporated by superheating, flows normally (in a steady state) through the second refrigerant conduit 112 of the double-pipe refrigerant-to-refrigerant heat exchanger 103. Accordingly, a sufficiently large amount of heat is not exchanged between the high pressure refrigerant flowing through the first refrigerant conduit 11 of the double-pipe refrigerant-to-refrigerant heat exchanger 103 and the low pressure refrigerant flowing through the second refrigerant conduit 112. This causes the air passing through the evaporator 105 to be cooled with an insufficient degree of efficiency, thereby raising the problem of being unable to actually expect greater improvement in the performance of cooling the passenger compartment.

SUMMARY OF THE INVENTION

It is therefore an object of the present invention to provide a refrigeration cycle system that can provide improvements both in the performance of a refrigerant evaporator and the amount of heat to be exchanged between low and high pressure refrigerants in the refrigerant-to-refrigerant heat exchanger for exchanging heat between the high pressure refrigerant delivered from the liquid refrigerant receiver and directed to the refrigerant evaporator and the low pressure refrigerant delivered from the refrigerant evaporator and directed to the refrigerant compressor. It is another object of the present invention to provide a refrigeration cycle system which provides improvements in mounting the refrigerant-to-refrigerant heat exchanger and a variable throttle valve to a vehicle such as an automobile. It is a further object of the present invention to provide a refrigeration cycle system that can provide a simplified structure to the variable throttle valve.

According to a first aspect of the invention, for example, an excessive amount of a refrigerant circulating through the refrigeration cycle system for its cooling load would cause the low pressure refrigerant delivered from the refrigerant evaporator and directed to the refrigerant compressor to be changed into two phases, liquid and gas. This results in a larger amount of heat being exchanged in the refrigerant-to-refrigerant heat exchanger when compared with a saturated gaseous refrigerant.

Accordingly, the high-pressure refrigerant delivered from the liquid refrigerant receiver and directed to the refrigerant evaporator is cooled by the low-pressure refrigerant delivered from the refrigerant evaporator and directed to the refrigerant compressor. This provides a higher level of subcooling to the refrigerant introduced into the variable throttle valve.

In this case, the area of opening or the degree of throttle opening of the valve hole of the variable throttle valve or the amount of lift of the valve body can be reduced as the level of subcooling of the refrigerant delivered from the refrigerant-to-refrigerant heat exchanger increases, thereby decreasing the amount of the refrigerant circulating through the refrigeration cycle system. Accordingly, the degree of dryness or the level of superheating of refrigerant on the outlet side of the refrigerant evaporator is optimized and thus the performance of the refrigerant evaporator is improved.

On the other hand, for example, an insufficient amount of a refrigerant circulating through the refrigeration cycle system for its cooling load would cause an excessive level of superheating of the low pressure refrigerant delivered from the refrigerant evaporator and directed to the refrigerant compressor. This results in a smaller amount of heat being exchanged in the refrigerant-to-refrigerant heat exchanger. At this time, a lower level of subcooling is provided to the refrigerant introduced into the variable throttle valve.

In this case, the area of opening or the degree of throttle opening of the valve hole of the variable throttle valve or the amount of lift of the valve body can be increased as the level of subcooling of the refrigerant delivered from the refrigerant-to-refrigerant heat exchanger decreases. This increases the amount of the refrigerant circulating through the refrigeration cycle system. Accordingly, the degree of dryness or the level of superheating of refrigerant on the outlet side of the refrigerant evaporator is optimized and thus the performance of the refrigerant evaporator is improved.

Accordingly, it is possible to indirectly control the level of superheating of refrigerant on the outlet side of the refrigerant evaporator by adjusting the amount of the refrigerant circulating through the refrigeration cycle system in response to the level of subcooling of the refrigerant. Additionally, a certain degree of dryness can be provided to the refrigerant on the outlet side of the refrigerant evaporator as the level of subcooling of the refrigerant introduced into the variable throttle valve decreases. This allows a larger amount of heat to be exchanged between the high pressure refrigerant delivered from the liquid refrigerant receiver and directed to the refrigerant evaporator and the low pressure refrigerant delivered from the refrigerant evaporator and directed to the refrigerant compressor, thereby facilitating the subcooling of the high pressure refrigerant by the low pressure refrigerant. Accordingly, since a higher level of subcooling can be provided to the refrigerant introduced into the variable throttle valve, it is possible to provide improvements both in the performance of the refrigerant evaporator and the amount of heat to be exchanged in the refrigerant-to-refrigerant heat exchanger.

On the other hand, since a certain degree of dryness can be provided to the refrigerant on the outlet side of the refrigerant evaporator as the level of subcooling of the refrigerant introduced into the variable throttle valve decreases, noises generated in the refrigerant compressor are minimally transmitted to the refrigerant evaporator and are essentially prevented. On the other hand, the prior art refrigeration cycle system employs a typical temperature controlled expansion valve to control the level of superheating of refrigerant on the outlet side of the refrigerant evaporator. This provides less of an effect of cooling the high-pressure refrigerant by the low-pressure refrigerant in the refrigerant-to-refrigerant heat exchanger and a greatly reduced improvement in the cooling performance. However, using the variable throttle valve according to the present invention makes it possible to improve the cooling performance.

According to a second aspect of the present invention, the variable throttle valve is disposed downstream of the refrigerant-to-refrigerant heat exchanger in the direction of refrigerant flow and upstream of the refrigerant evaporator in the direction of refrigerant flow, which allows the high pressure liquid refrigerant subcooled in the refrigerant-to-refrigerant heat exchanger to be supplied to the variable throttle valve. This makes it possible to prevent noises generated in the variable throttle valve when compared with a system allowing a refrigerant of two phases, liquid and gas, to be introduced into the valve hole. This also facilitates the creation of a refrigerant having two phases of liquid and gas when the high pressure refrigerant passes through the valve hole of the variable throttle valve, thereby providing improved performance to the refrigerant evaporator.

According to a second aspect of the present invention, the refrigerant-to-refrigerant heat exchanger has a first refrigerant conduit through which a high pressure refrigerant delivered from the liquid refrigerant receiver and directed to the variable throttle valve flows and a second refrigerant conduit through which a low pressure refrigerant delivered from the refrigerant evaporator and directed to the refrigerant compressor flows. With this arrangement, heat can be exchanged between the high-pressure refrigerant delivered from the liquid refrigerant receiver and directed to the refrigerant evaporator and the low pressure refrigerant delivered from the refrigerant evaporator and directed to the refrigerant compressor. This allows the low pressure refrigerant to absorb heat from the high pressure refrigerant, thereby making it possible to further subcool the high-pressure liquid refrigerant delivered from the liquid refrigerant receiver. On the other hand, the low pressure refrigerant is heated by the high pressure refrigerant, thereby making it possible to further evaporate the low pressure refrigerant delivered from the refrigerant evaporator by superheating.

According to the fourth and fifth aspects of the inventions, the refrigerant-to-refrigerant heat exchanger can be either a double-pipe refrigerant-to-refrigerant heat exchanger with an outer circumferential surface of one of the first and second refrigerant conduits being surrounded with the other refrigerant conduit, or a double-layer refrigerant-to-refrigerant heat exchanger with one end face of one of the first and second refrigerant conduits being in close contact with one end face of the other refrigerant conduit. Since this makes it possible to reduce the size of the refrigerant-to-refrigerant heat exchanger and provide improvements in mounting the refrigerant-to-refrigerant heat exchanger in position, a space for installing the refrigerant-to-refrigerant heat exchanger can be reduced in the engine room of a vehicle such as an automobile.

According to a sixth aspect of the present invention, the variable throttle valve is incorporated in the high-pressure refrigerant passageway that is defined in a pipe joint or a block for connecting between the first refrigerant conduit of the refrigerant-to-refrigerant heat exchanger and an inlet pipe of the refrigerant evaporator, thereby making it possible to provide an improvement in mounting of the variable throttle valve. Furthermore, the system has no temperature-sensitive cylinder for sensing the level of superheating on the outlet side of the refrigerant evaporator. This arrangement allows the variable throttle valve to be operated with only the high-pressure refrigerant passageway being defined in the pipe joint or the block, thus providing a simplified structure to the pipe joint or the block. Moreover, the variable throttle valve incorporated in the high-pressure refrigerant passageway eliminates the necessity for an external sealing structure, thereby providing for a simplified configuration.

According to a seventh aspect of the invention, the variable throttle valve is inserted into the high pressure refrigerant passageway defined within the first refrigerant conduit of the refrigerant-to-refrigerant heat exchanger and thus incorporated into the high pressure refrigerant passageway, thereby providing an improvement in mounting of the variable throttle valve. Furthermore, the variable throttle valve incorporated in the high pressure refrigerant passageway eliminates the necessity for an external sealing structure, thereby providing for a simplified configuration.

According to an eighth aspect of the invention, when the level of subcooling of a refrigerant delivered from the first refrigerant conduit of the refrigerant-to-refrigerant heat exchanger and introduced into the valve hole of the variable throttle valve increases and the internal pressure of the first pressure chamber is lower than the internal pressure of the second pressure chamber, the diaphragm is displaced drivingly close to the valve body accompanied by a biasing force of the valve body bias means. This allows the amount of the refrigerant circulating through the refrigeration cycle system to be reduced, thereby providing a higher level of superheat of the refrigerant on the outlet side of the refrigerant evaporator.

On the other hand, when the level of subcooling of a refrigerant delivered from the first refrigerant conduit of the refrigerant-to-refrigerant heat exchanger and introduced into the valve hole of the variable throttle valve decreases and the internal pressure of the first pressure chamber is higher than the internal pressure of the second pressure chamber, the diaphragm is displaced to drivingly open the valve body against a biasing force of the valve body bias means. This allows the amount of the refrigerant circulating through the refrigeration cycle system to increase, thereby providing a lower level of superheating of the refrigerant on the outlet side of the refrigerant evaporator.

According to the ninth and tenth aspects of the invention, when the cycle switching means changes the first refrigeration cycle to the second refrigeration cycle, a high-temperature high-pressure refrigerant discharged from the refrigerant compressor bypasses the refrigerant condenser and the liquid refrigerant receiver, and then flows through the first refrigerant conduit of the refrigerant-to-refrigerant heat exchanger and the variable throttle valve into the refrigerant evaporator. Then, in the refrigerant evaporator, heat is exchanged between the air flowing through the air conditioning casing of the air conditioning unit and a depressurized refrigerant (hot gas) to add heat to the air flowing through the air conditioning casing, thereby enhancing the heating capability of the hot-water heater upon starting the engine or immediately after the engine has been started.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

[Configuration of First Embodiment]

Figure 1:
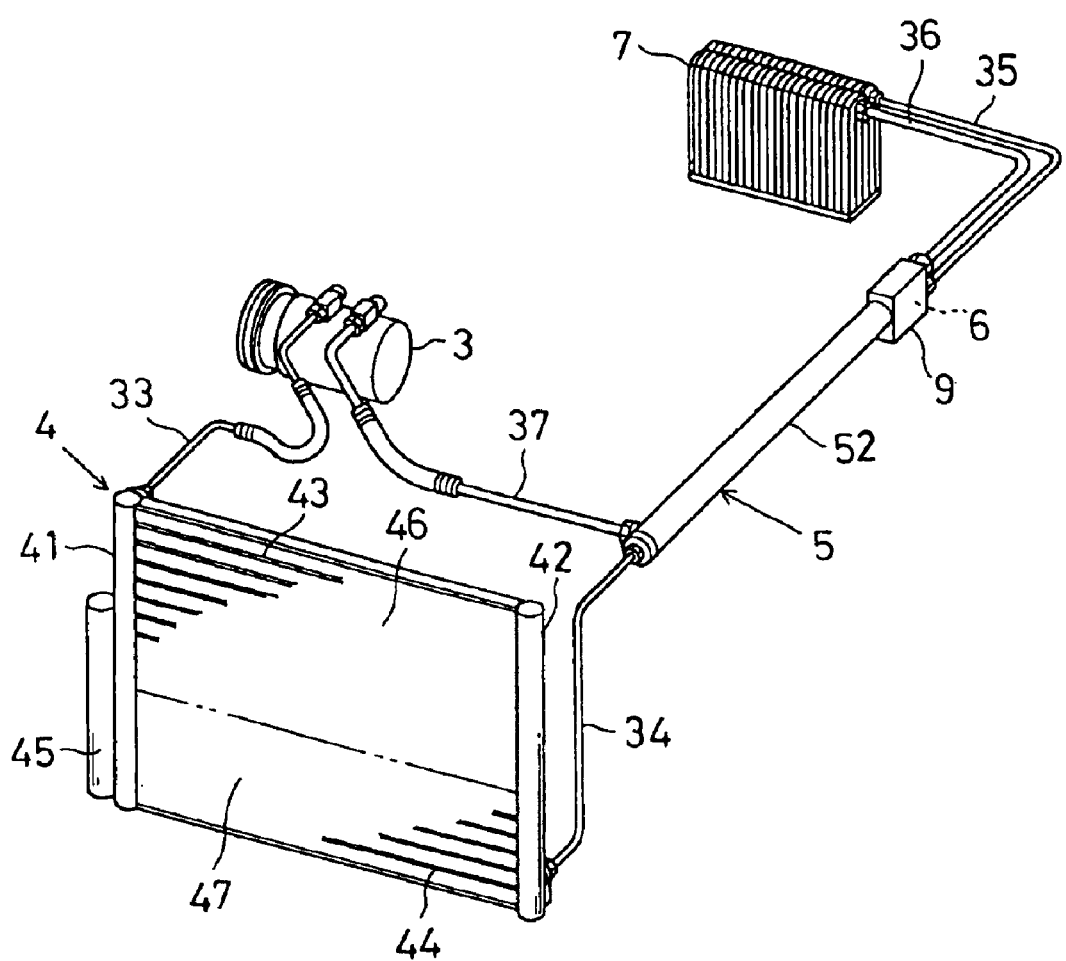
FIG. 1 is a diagram of a refrigeration cycle of a vehicle air conditioning system according to a first embodiment.
Figure 2:
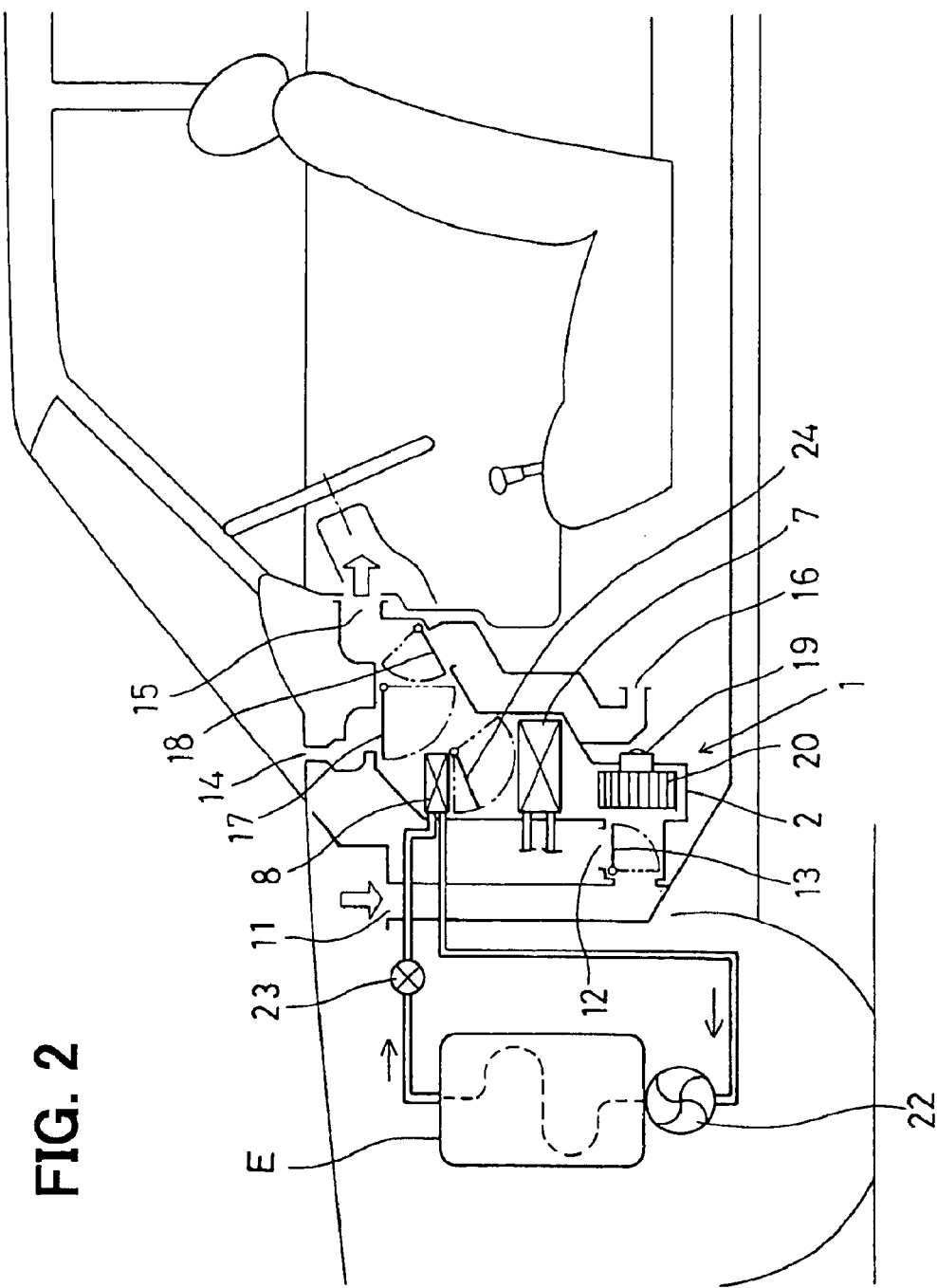
FIG. 2 is a diagram of the configuration of an air conditioning unit of the vehicle air conditioning system according to the first embodiment.

FIGS. 1 to 6 illustrate a first embodiment of the present invention. FIG. 1 is a refrigeration cycle of a vehicle air conditioning system, and FIG. 2 is an air conditioning unit of the vehicle air conditioning system.

The vehicle air conditioning system according to this embodiment is an automatic air conditioner. The automatic air conditioner allows an air conditioning control unit (hereinafter referred to as the air conditioner ECU) to control each of the air conditioning state varying means (actuators) of an air conditioning unit 1 to air condition the passenger compartment of a vehicle such as an automobile equipped with an internal combustion engine (hereinafter referred to as the engine) E.

The air conditioning unit 1 comprises an air conditioning casing 2, disposed on the front side of the passenger compartment of the vehicle, for defining an air passageway therein. At the upstream most part of the air conditioning casing 2 in the direction of airflow, there is provided an inside/outside air switching box in which are formed an outside air suction port 11, through which air outside the passenger compartment (outside air) is drawn, and an inside air suction port 12 through which air inside the passenger compartment (inside air) is drawn. There is also provided an inside/outside air switching door 13, housed in the inside/outside air switching box, for selectively opening or closing the outside air suction port 11 and the inside air suction port 12. Downstream of these components in the direction of airflow, there is provided an air blower of a centrifugal type for adjusting the flow rate of air introduced into the passenger compartment. For example, the inside/outside air switching door 13 is driven by an actuator (not shown) such as a servomotor to change the suction port mode at least between an outside air drawing (FRS) mode and an inside air circulating (REC) mode.

The centrifugal air blower has a scroll casing integrated with the air conditioning casing 2, a blower motor 19 allowing a blower drive circuit (not shown) to control a voltage applied thereto (a blower control voltage) to change its rotational speed, and a centrifugal fan 20 rotatably driven by the blower motor 19. At the downstream most part of the air conditioning casing 2 in the direction of airflow, there are provided a defroster (DEF) opening 14 for blowing air toward the inner surface of the front windshield of the vehicle, a face (FACE) opening 15 for blowing conditioned air toward the upper body (e.g., the head and chest portions) of a vehicle passenger, a foot (FOOT) opening 16 for blowing conditioned air to the lower body (e.g., the foot portion) of a vehicle passenger, and switching doors 17, 18 for selectively opening or closing each of these blowing openings.

The opening switching doors 17, 18, which are driven, for example, by an actuator (not shown) such as a servomotor, switch the blowing opening mode at least between a face (FACE) mode, a bi-level (B/L) mode, a foot (FOOT) mode, a foot/defroster (F/D) mode, and a defroster (DEF) mode. Furthermore, upstream of the plurality of blowing opening switching doors 17, 18 in the direction of airflow, a hot-water heater (heater core) 8 for re-heating the air having passed through an evaporator 7 is disposed so as to block part of an airflow passageway in the air conditioning casing 2. The hot-water heater 8 is disposed at some midpoint in a cooling water circulation circuit in which a cooling water circulation flow is produced by a water pump 22 that is driven by the engine E. Additionally, the hot-water heater 8 allows cooling water to circulate therethrough, which has absorbed wasted heat from the engine E, when a hot water valve 23 disposed in the cooling water circulation circuit is opened, and utilizes the cooling water as a heating heat source. With this arrangement, the hot-water heater 8 constitutes a heating heat exchanger which allows the air passing through the air conditioning casing 2 to exchange heat with the cooling water to be thereby heated.

The hot-water heater 8 is also provided with an air mix door 24 for adjusting the volume of air passing through the hot-water heater 8 and the volume of air bypassing the hot-water heater 8 to thereby control the blowing temperature of air blown into the passenger compartment. For example, the air mix door 24 is driven by means of an actuator (not shown) such as a servomotor. Between the centrifugal air blower and the hot-water heater 8, the evaporator 7, serving as a component of the refrigeration cycle mounted in the vehicle, is interposed so as to block the entire airflow passageway in the air conditioning casing 2.

Figure 3:
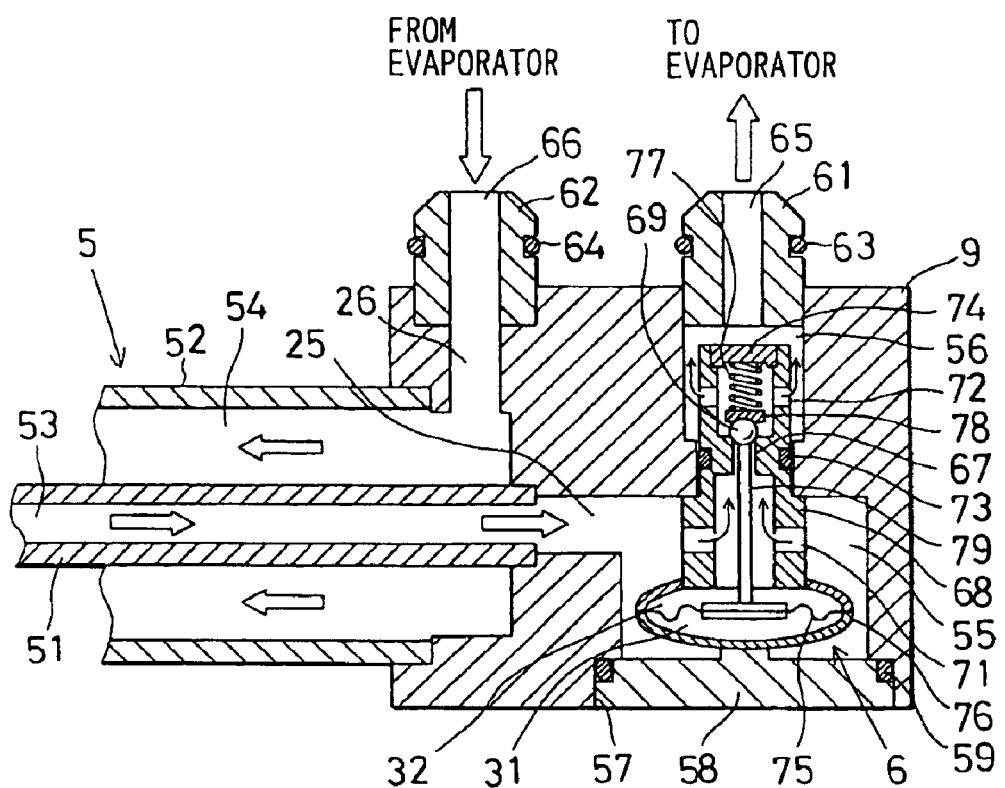
FIG. 3 is a cross-sectional view of a reverse sub-cooling control valve incorporated into a cubic box integrated with an end joint portion of a double-pipe refrigerant-to-refrigerant heat exchanger according to the first embodiment.

The evaporator 7 according to this embodiment is a refrigerant evaporator for evaporating a refrigerant that has two phases consisting of a liquid and a gas, which has been adiabatically expanded upon passing through a throttle hole 67 of a reverse sub-cooling control valve 6 in the refrigeration cycle. The evaporator 7 constitutes a cooling heat exchanger for allowing the air passing through the air conditioning casing 2 to exchange heat with the refrigerant to be thereby cooled. As shown in FIGS. 1 and 3, the evaporator 7 is a layered heat exchanger that has an inlet tank portion connected via an inlet pipe 35 to a first refrigerant passageway 25 defined in a cubic block joint 9 having the reverse sub-cooling control valve 6 therein, an outlet tank portion connected via an outlet pipe 36 to a second refrigerant passageway 26 defined in the block joint 9, and a combination of molded plates and corrugated fins that are alternately stacked in layers to define a U-shaped refrigerant evaporation passageway connecting between the inlet and outlet tank portions.

The aforementioned refrigeration cycle, mounted in a vehicle such as an automobile, comprises a compressor (refrigerant compressor) 3, a sub-cooling condenser 4, a refrigerant-to-refrigerant heat exchanger 5, the reverse sub-cooling control valve (variable throttle valve) 6, the evaporator (refrigerant evaporator) 7, and a refrigerant conduit for annularly connecting between these components. The compressor 3 is a refrigerant compressor for compressing a refrigerant drawn through the suction port and then discharging it from the discharge port. The compressor 3 is connected to the output shaft of the engine E via an electromagnetic clutch (not shown). The electromagnetic clutch interrupts the transmission of power from the engine E to the compressor 3. It is also possible to rotatably drive the drive shaft of the compressor 3 by means of an electric motor.

Figure 6A:
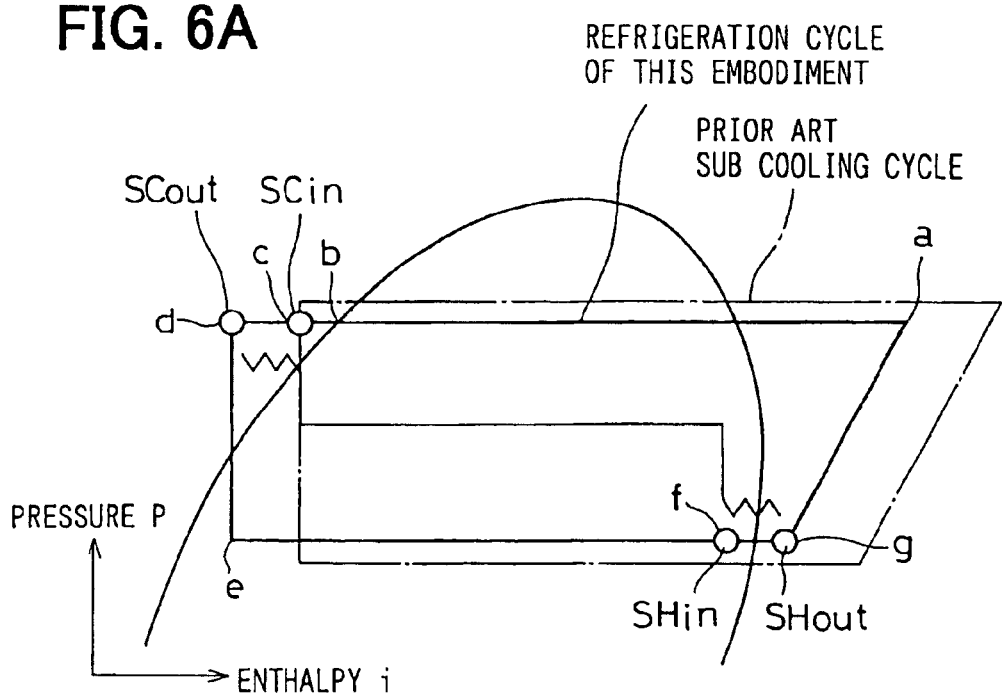
FIG. 6A is a Mollier chart of the refrigeration cycle of the vehicle air conditioning system according to the first embodiment.
Figure 6B:
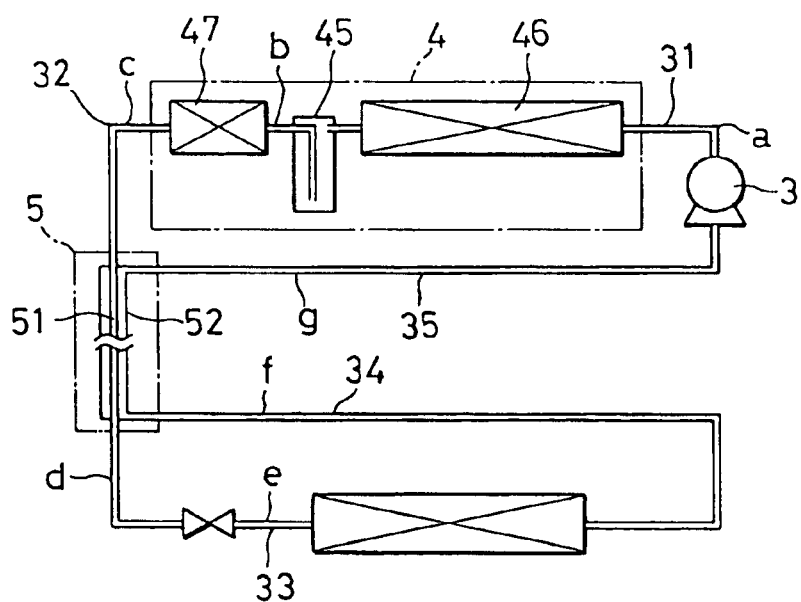
FIG. 6B is a diagram of the configuration of the refrigeration cycle of the vehicle air conditioning system.

As shown in FIGS. 1 and 6B, the sub-cooling condenser 4 has a first header 41 connected via a high pressure refrigerant conduit 33 to the discharge port of the compressor 3, a second header 42 connected via a high pressure refrigerant conduit 34 to the inlet portion of the refrigerant-to-refrigerant heat exchanger 5, a plurality of tubes 43, 44 and fins (not shown) connected between the first and second headers 41, 42, and a receiver 45 connected to the back wall surface of the first header 41.

The interior of the first header 41 is divided by a plurality of partitioning walls (not shown) into an inlet tank chamber, an outlet tank chamber, and an inlet tank chamber (none of which are shown). To the contrary, the interior of the second header 42 is divided by means of a single partitioning wall (not shown) into an intermediate tank chamber and an outlet tank chamber (not shown). There are also provided a plurality of tubes 43 and fins, which are connected between the inlet and outlet tank chambers of the first header 41 and the intermediate tank chamber of the second header 42, that constitute a refrigerant condenser 46. The refrigerant condenser 46 allows the refrigerant discharged from the discharge port of the compressor 3 to exchange heat with the air outside the passenger compartment (outside air) to be condensed to a liquid refrigerant.

A plurality of tubes 43 and fins, which are connected between the inlet tank chamber of the first header 41 and the outlet tank chamber of the second header 42, constitute a sub-cooler 47 for allowing a liquid refrigerant delivered from the receiver 45 to exchange heat with outside air to be thereby subcooled. The receiver 45 is a liquid refrigerant receiver that separates the refrigerant condensed and liquefied at the refrigerant condenser 46 into a liquid and gaseous refrigerant that allows only the liquid refrigerant to be delivered to the subcooler 47.

Figure 4A:
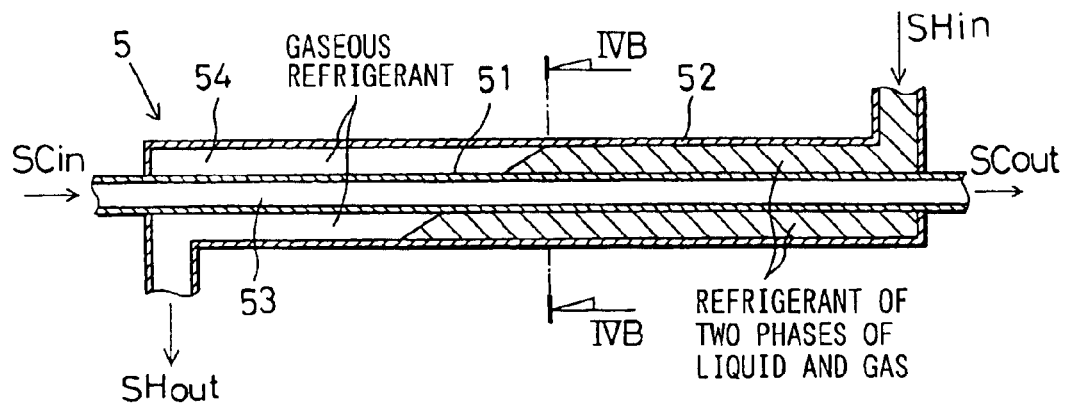
FIG. 4A is a cross-sectional view of the double-pipe refrigerant-to-refrigerant heat exchanger according to the first embodiment.
Figure 4B:
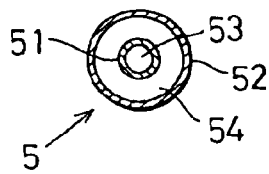
FIG. 4B is a cross-sectional view of the double-pipe refrigerant-to-refrigerant heat exchanger taken along line IVB—IVB of FIG. 4A.

As shown in FIGS. 3, 4A, and 4B, the refrigerant-to-refrigerant heat exchanger 5 exchanges heat between the high pressure refrigerant flowing through a first refrigerant conduit 51, which is connected in a liquid-tight sealing manner at some midpoint in the high pressure refrigerant conduit (high pressure liquid line) 34, and the low pressure refrigerant flowing through a second refrigerant conduit 52, which is connected in a liquid-tight sealing manner at some midpoint in a low pressure refrigerant conduit (low pressure suction conduit) 37. In the first refrigerant conduit 51, there is defined a first refrigerant heat exchange passageway 53 that is in fluid communication with the first refrigerant passageway 25 defined in the block joint 9. In the second refrigerant conduit 52, a second refrigerant heat exchange passageway 54 is defined that is in fluid communication with the second refrigerant passageway 26 defined in the block joint 9.

In the refrigerant-to-refrigerant heat exchanger 5, the first refrigerant conduit 51 and the second refrigerant conduit 52 are disposed in close proximity to each other so that heat can be exchanged between the refrigerants flowing through them. More specifically, the refrigerant-to-refrigerant heat exchanger 5 is configured as such a double-pipe refrigerant-to-refrigerant heat exchanger that allows the first refrigerant conduit 51, which has a circular cross section, to be surrounded by the second refrigerant conduit 52, which has an annular cross section. A high-pressure refrigerant delivered from the subcooler 47 and directed to the reverse sub-cooling control valve 6 flows through the inner first refrigerant heat exchange passageway 53 in the refrigerant-to-refrigerant heat exchanger 5. A low-pressure refrigerant delivered from the evaporator 7 and directed to the compressor 3 flows through the outer second refrigerant heat exchange passageway 54 in the refrigerant-to-refrigerant heat exchanger 5. The low-pressure refrigerant flows opposite in direction to the high-pressure refrigerant to thereby exchange heat between them.

Figure 5:
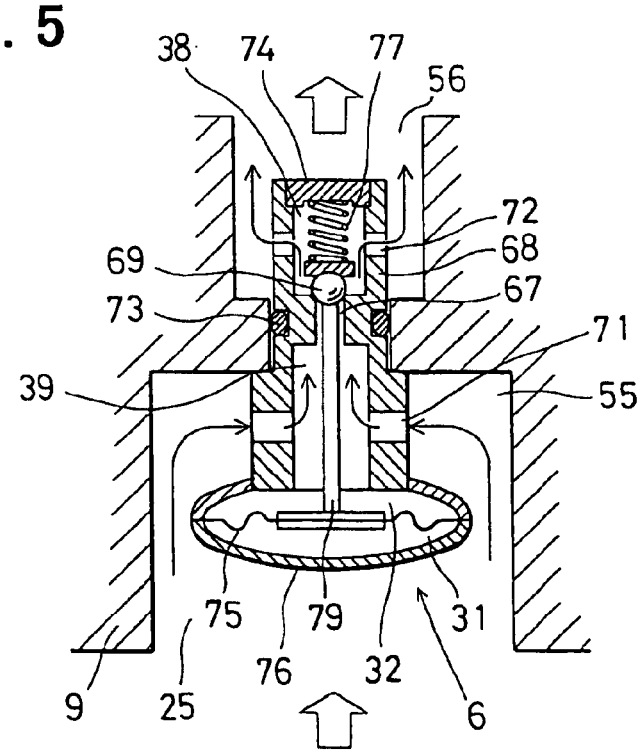
FIG. 5 is a cross-sectional view of the reverse sub-cooling control valve according to the first embodiment.

As shown in FIGS. 3 and 5, the reverse sub-cooling control valve 6 is accommodated and held within the first refrigerant passageway 25 of the cubic block joint (connector) 9 joined to an end joint portion of the refrigerant-to-refrigerant heat exchanger 5. Inside the block joint 9, the second refrigerant passageway 26 is defined in the first refrigerant passageway 25. The passageways 25, 26 are separated from each other by a boundary wall portion of the block joint 9.

In the first refrigerant passageway 25, the upstream side of the throttle hole 67 of the reverse sub-cooling control valve 6 is defined as a high pressure refrigerant passageway 55, while the downstream side of the throttle hole 67 of the reverse sub-cooling control valve 6 is defined as a low pressure refrigerant passageway 56. The block joint 9 has an opening 57, which communicates with the outside, at the lowest part of the high-pressure refrigerant passageway 55 shown in FIG. 3. The opening 57 is blocked with a cover 58. An O-ring 59 is provided between the outer circumferential surface of the cover 58 and the inner wall surface of the opening 57 of the block joint 9 to prevent leakage of the refrigerant.

For example, the block joint 9, which is made of a metallic material and formed in a predetermined shape in one piece, is a pipe joint for connecting, in a liquid-tight sealing manner, between the first refrigerant conduit 51 of the refrigerant-to-refrigerant heat exchanger 5 and the inlet pipe 35 of the evaporator 7 as well as for connecting, in a liquid-tight sealing manner, between the second refrigerant conduit 52 of the refrigerant-to-refrigerant heat exchanger 5 and the outlet pipe 36 of the evaporator 7. The outer wall surface of the block joint 9, i.e., the opening at the downstream end of the low pressure refrigerant passageway 56 of the first refrigerant passageway 25 and the opening at the upstream end of the second refrigerant passageway 26 are connected by welding or the like with a circular-tube-shaped first sleeve nipple 61 connected to the inlet pipe 35 of the evaporator 7 and a circular-tube-shaped second sleeve nipple 62 connected to the outlet pipe 36 of the evaporator 7, respectively. Here, the first and second sleeve nipples 61, 62 may also be integrated with the block joint 9.

Between the outer circumferential surface of the first sleeve nipple 61 and the inner circumferential surface of the inlet pipe 35, there is provided an O-ring 63 for preventing the leakage of refrigerant. Additionally, between the outer circumferential surface of the second sleeve nipple 62 and the inner circumferential surface of the outlet pipe 36, there is provided an O-ring 64 for preventing the leakage of refrigerant. In the first sleeve nipple 61, there is formed a round-hole-shaped first communication pathway 65 which allows the inner first refrigerant heat exchange passageway 53 of the refrigerant-to-refrigerant heat exchanger 5 to communicate with the outlet pipe 36 of the evaporator 7 via the first refrigerant passageway 25 in the block joint 9. In the second sleeve nipple 62, there is formed a round-hole-shaped second communication pathway 66 which allows the inlet pipe 35 of the evaporator 7 to communicate with the outer second refrigerant heat exchange passageway 54 in the refrigerant-to-refrigerant heat exchanger 5 via the second refrigerant passageway 26 in the block joint 9.

The reverse sub-cooling control valve 6 according to this embodiment corresponds to the variable throttle valve of the present invention. The reverse sub-cooling control valve 6 has a valve housing 68 with a throttle hole (valve hole) 67 for adiabatically expanding a liquid refrigerant passing therethrough into a refrigerant of two phases, that is, a liquid and a gas. The control valve 6 also has a valve (valve body) 69 for adjusting the area of opening or the degree of throttle opening of the throttle hole 67, and a valve body drive means for drivingly opening the valve 69 in response to the high pressure, the temperature, or the level of subcooling (SC) of the refrigerant introduced into the high pressure refrigerant passageway 55. The control valve 6 also has a valve body bias means for biasing the valve 69 to a close position.

The valve housing 68, which is formed generally in the shape of a circular tube, is installed in a liquid-tight sealing manner on the inner wall surface of the boundary wall portion that provides a partition between the high-pressure refrigerant passageway 55 and the low-pressure refrigerant passageway 56 in the block joint 9. On the outer circumferential portion of the valve housing 68, a refrigerant inlet port 71 and a refrigerant outlet port 72 are formed. The refrigerant inlet port 71 is a port in which a liquid refrigerant is introduced into the throttle hole 67 from the high-pressure refrigerant passageway 55. The refrigerant outlet port 72 is a port through which a refrigerant of two phases, that is, a liquid and a gas, passes through the throttle hole 67 to be introduced into the low-pressure refrigerant passageway 56.

Between the outer circumferential surface of the valve housing 68 and the inner wall surface on the boundary wall portion of the block joint 9, there is installed an O-ring 73 for preventing a refrigerant from bypassing the throttle hole 67 of the reverse sub-cooling control valve 6 and flowing directly from the high-pressure refrigerant passageway 55 into the low pressure refrigerant passageway 56. In the opening at an end of the valve housing 68 (the upper end in FIG. 5), an adjustment screw 74 for adjusting the valve opening pressure of the valve 69 is screwed into an inner circumferential threaded portion (not shown) that is formed in the opening. In the opening at the other end of the valve housing 68 (the lower end in the figure), a diaphragm casing 76 for housing a diaphragm 75 constituting the valve body drive means is secured.

The reverse sub-cooling control valve 6 according to this embodiment is accommodated and held in the first refrigerant passageway 25 of the block joint 9 after heat exchange in the refrigerant-to-refrigerant heat exchanger 5. That is, the reverse sub-cooling control valve 6 is inserted from the opening 57 into the first refrigerant passageway 25 of the block joint 9, and the opening 57 is kept airtight from the atmosphere using the O-ring 59 in the cover 58. At the same time, the shoulder portion formed on the outer circumferential portion of the valve housing 68 is securely forced against the boundary wall portion of the block joint 9. Here, the cover 58 is tightly secured in a manner such that the threaded portion provided on the outer circumference of the cover 58 is fixedly screwed into the threaded portion provided on the inner circumference of the opening 57. The cover 58 may also be secured to the block joint 9 using a fixing means such as a circlip.

According to this embodiment, the valve body biasing means employed is a coiled return spring 77 (hereinafter simply referred to as the spring). The spring 77 is accommodated in a low-pressure refrigerant passageway 38 inside the valve housing 68. One end of the spring 77 (the upper end in FIG. 3) is engaged with or held by the adjustment screw 74, while the other end of the spring 77 (the lower end in FIG. 3) is engaged with or held by a spring support member 78, which is coupled to or abuts against the valve 69.

The valve body drive means according to this embodiment utilizes the diaphragm 75 that is vertically displaced in FIGS. 3 and 5 depending on the pressure difference between the internal pressure of a first pressure chamber 31 and the internal pressure of a second pressure chamber 32, and an actuating rod (a rod-shaped body) 79 for transmitting the displacement of the diaphragm 75 to the valve 69. As mentioned above, the diaphragm 75 is accommodated in the diaphragm casing 76. The interior space of the diaphragm casing 76 is divided into the first pressure chamber 31 and the second pressure chamber 32 by means of the diaphragm 75.

In the first pressure chamber 31 defined by the diaphragm 75 on one side (the lower side in the figures), a medium (e.g., a gaseous refrigerant) is sealed and encapsulated that converts a temperature change, in a refrigerant delivered from the first refrigerant conduit 51 of the refrigerant-to-refrigerant heat exchanger 5 and introduced into the high pressure refrigerant passageway 55 of the first refrigerant passageway 25, to a pressure change. On the other hand, the interior of the second pressure chamber 32 defined by the diaphragm 75 on the other side (the upper side in the figure) is subjected to a high pressure of a refrigerant which is delivered from the first refrigerant conduit 51 of the refrigerant-to-refrigerant heat exchanger 5 and introduced from the high pressure refrigerant passageway 55 of the first refrigerant passageway 25 into a high pressure refrigerant passageway 39 in the valve housing 68. In other words, the second pressure chamber 32 is in fluid communication with the high pressure refrigerant passageway 39.

Suppose that the level of sub-cooling (SCout) of a refrigerant, which is delivered from the first refrigerant conduit 51 of the refrigerant-to-refrigerant heat exchanger 5 and introduced into the high pressure refrigerant passageway 55 around the first pressure chamber 31 of the reverse sub-cooling control valve 6, increases. Furthermore, suppose the internal pressure of the first pressure chamber 31 is lower than the internal pressure of the second pressure chamber 32. In this case, the reverse sub-cooling control valve 6 allows the diaphragm 75 and the actuating rod 79 to be displaced downwardly in the figure so that the reverse sub-cooling control valve 6 is accompanied by the biasing force of the spring 77 to drive close the valve 69.

Suppose also that the level of sub-cooling (SCout) of a refrigerant, which is delivered from the first refrigerant conduit 51 of the refrigerant-to-refrigerant heat exchanger 5 and introduced into the high pressure refrigerant passageway 55 around the first pressure chamber 31 of the reverse sub-cooling control valve 6, decreases. Furthermore, suppose the internal pressure of the first pressure chamber 31 is higher than the internal pressure of the second pressure chamber 32. In this case, the reverse sub-cooling control valve 6 allows the diaphragm 75 and the actuating rod 79 to be displaced upwardly in the figure so that the reverse sub-cooling control valve 6 drives open the valve 69 against the biasing force of the spring 77.

[Operation of First Embodiment]

Now, the operation of the refrigeration cycle of the vehicle air conditioning system according to this embodiment is briefly described with reference to FIGS. 1 to 6. Here, FIG. 6A is a Mollier chart showing points of state of a refrigerant in the refrigerant circuit of the refrigeration cycle. FIG. 6B shows points of state "a" to "g" of the refrigerant in the refrigerant circuit in the refrigeration cycle corresponding to the points of state "a" to "g" on the Mollier chart of FIG. 6A.

For example, as shown in FIG. 2, the passenger compartment of a vehicle such as an automobile is cooled as follows. That is, the system allows the inside/outside air switching door 13 to switch the suction port mode to the outside air drawing (FRS) mode for fully opening the outside air suction port 11 and for fully closing the inside air suction port 12. The system also allows the switching doors 17, 18 to switch the blowing opening mode to the face (FACE) mode for fully opening the FACE blowing opening 15 and for fully closing the DEF blowing opening 14 and the FOOT blowing opening 16. At this time, the air mix door 24 is opened to a predetermined degree of opening to provide a blowing temperature responsive to the set point temperature that is set by a vehicle passenger.

Rotatably driving the compressor 3 by means of the engine E or the like which is mounted in a vehicle such as an automobile would cause a refrigerant to circulate through the refrigeration cycle. The refrigerant is then compressed in the compressor 3, allowing a high pressure gaseous refrigerant (point of state "a") discharged from the discharge port to be introduced into the refrigerant condenser 46 of the sub-cooling condenser 4. Upon passing through the refrigerant condenser 46, the high pressure gaseous refrigerant introduced into the refrigerant condenser 46 gives off heat to the outside air and is thus cooled, being condensed into a liquid refrigerant.

Thereafter, the high-pressure refrigerant delivered from the refrigerant condenser 46 is introduced into the receiver 45 to be separated into a liquid and gaseous refrigerant (point of state "b"). Then, only the liquid refrigerant is introduced into the subcooler 47. The liquid refrigerant introduced into the subcooler 47 gives heat off to the outside air upon passing through the subcooler 47 to be further cooled and thus subcooled (point of state "c"). Thereafter, as shown in FIG. 4, the high pressure refrigerant delivered from the subcooler 47 is introduced into the first refrigerant heat exchange passageway 53 defined in the inner first refrigerant conduit 51 of the refrigerant-to-refrigerant heat exchanger 5 (SCin).

The refrigerant-to-refrigerant heat exchanger 5 according to this embodiment has a double-pipe configuration in which a high pressure refrigerant delivered from the subcooler 47 and directed to the reverse sub-cooling control valve 6 flows through the inner first refrigerant heat exchange passageway 53, while a low pressure refrigerant delivered from the evaporator 7 and directed to the compressor 3 flows through the outer second refrigerant heat exchange passageway 54. Here, the low-pressure refrigerant flows in the direction opposite to the high-pressure refrigerant to exchange heat between the refrigerants. This allows the high pressure liquid refrigerant introduced into the inner first refrigerant heat exchange passageway 53 to exchange heat with the low pressure refrigerant flowing through the outer second refrigerant heat exchange passageway 54 to be further subcooled into a high pressure refrigerant of a single phase of liquid (SCout, point of state "d").

Thereafter, as shown in FIGS. 3 and 5, the high pressure refrigerant delivered from the first refrigerant heat exchange passageway 53 of the first refrigerant conduit 51 in the refrigerant-to-refrigerant heat exchanger 5 and introduced into the high pressure refrigerant passageway 55 of the first refrigerant passageway 25 in the block joint 9 is introduced from the refrigerant inlet port 71 of the valve housing 68 in the reverse sub-cooling control valve 6 into the high pressure refrigerant passageway 39 and then passed through the throttle hole 67 of the reverse sub-cooling control valve 6. Upon passing through the throttle hole 67, the high pressure refrigerant is suddenly expanded adiabatically to be separated into a gas and liquid phase refrigerant (point of state "e"), which is then introduced into the low pressure refrigerant passageway 38. Then, the low pressure refrigerant introduced from the refrigerant outlet port 72 of the valve housing 68 into the low pressure refrigerant passageway 56 of the first refrigerant passageway 25 in the block joint 9 passes through the first communication pathway 65 of the first sleeve nipple 61 to be introduced into the inlet pipe 35 of the evaporator 7.

Then, the low pressure refrigerant introduced into the inlet pipe 35 flows into the inlet tank portion of the evaporator 7 to be introduced into the plurality of U-shaped refrigerant evaporation passageways. Thereafter, the refrigerant introduced into the refrigerant evaporation passageway of the evaporator 7 exchanges heat with the outside air flowing through the air conditioning casing 2 upon passing through the refrigerant evaporation passageway, thereby being evaporated. As discussed later, since this embodiment is designed to obtain a certain level of superheating (SH) of refrigerant in the second refrigerant heat exchange passageway 54 defined in the outer second refrigerant conduit 52 in the refrigerant-to-refrigerant heat exchanger 5, the refrigerant is kept from evaporating at the outlet side of the evaporator 7 until the refrigerant is in a superheated vapor state (SHin, point of state "f").

Then, the low pressure refrigerant delivered from the refrigerant evaporation passageway of the evaporator 7 is introduced into the outlet side tank portion to pass through the outlet pipe 36 and is then introduced from the second communication pathway 66 of the second sleeve nipple 62 into the second refrigerant passageway 26 of the block joint 9. Thereafter, as shown in FIGS. 3 and 4, the low pressure liquid and gas phase refrigerant introduced into the second refrigerant passageway 26 flows into the second refrigerant heat exchange passageway 54 defined in the outer second refrigerant conduit 52 in the refrigerant-to-refrigerant heat exchanger 5. Then, as shown in FIG. 4, the low pressure refrigerant introduced into the outer second refrigerant heat exchange passageway 54 exchanges heat with the high pressure refrigerant flowing through the inner first refrigerant heat exchange passageway 53 to be heated and is then formed into a low pressure refrigerant of a single phase of gas (superheated vapor) (SHout, point of state "g"). Subsequently, the low pressure gaseous refrigerant in the superheated vapor state is drawn into the suction port of the compressor 3.

On the other hand, hot air drawn into the air conditioning casing 2 by the centrifugal fan 20 rotating in the centrifugal air blower gives off heat to a low temperature refrigerant upon the air's passing through the evaporator 7. As a result, the hot air is cooled into a cooled air. For example, the cooled air is turned into a conditioned air having a comfortable blowing temperature that is a result of the degree of door opening of the air mix door 24. Subsequently, the air is then blown into the passenger compartment through the FACE opening 15, thereby cooling the passenger compartment of a vehicle such as an automobile.

The refrigeration cycle according to this embodiment is designed as follows. That is, an increase in the level of sub-cooling upstream of the throttle hole 67 of the reverse sub-cooling control valve 6 would decrease the degree of valve opening of the valve 69 of the reverse sub-cooling control valve 6. To the contrary, a decrease in the level of sub-cooling upstream of the throttle hole 67 of the reverse sub-cooling control valve 6 would increase the degree of valve opening of the valve 69 of the reverse sub-cooling control valve 6, thereby adjusting the amount of the refrigerant circulating through the refrigeration cycle. Additionally, this especially allows the level of the superheating (SH) on the outlet side of the evaporator 7, among other things in the performance of the evaporator 7, to be fed back to the level of the subcooling (SC) upstream of the throttle hole 67 of the reverse sub-cooling control valve 6.

More specifically, suppose that the amount of a refrigerant circulating through the refrigeration cycle is excessive for a cooling load. In this case, the low pressure refrigerant delivered from the evaporator 7 and directed to the compressor 3 has two phases of liquid and gas, allowing a larger amount of heat to be exchanged in the refrigerant-to-refrigerant heat exchanger 5. At this time, the high-pressure refrigerant gives off heat to the low-pressure refrigerant, thereby providing a higher level of superheating to the refrigerant drawn into the compressor 3. On the other hand, the low pressure refrigerant cools the high pressure refrigerant, providing a higher level of subcooling (SC) to the refrigerant upstream of the throttle hole 67 of the reverse sub-cooling control valve 6 in the direction of refrigerant flow.

In the foregoing, the reverse sub-cooling control valve 6 is designed such that a medium such as a gaseous refrigerant sealingly encapsulated in the first pressure chamber 31 on the lower side of the diaphragm 75 (as shown in FIG. 3) causes the saturation pressure to vary by the temperature of the high pressure refrigerant introduced into the high pressure refrigerant passageway 55 of the first refrigerant passageway 25 in the block joint 9. Additionally, the interior of the second pressure chamber 32 on the upper side of the diaphragm 75 (as shown in FIG. 3) is subjected to the high pressure of the high pressure refrigerant introduced into the throttle hole 67 of the reverse sub-cooling control valve 6. At the upper portion of the reverse sub-cooling control valve 6 in the figure, the spring 77 and the adjustment screw 74 are so set as to provide a load against the load produced by the diaphragm 75 for the degree of valve opening of the valve 69 to be controllable by the level of subcooling.

Accordingly, an increase in the level of the subcooling (SC) upstream of the throttle hole 67 of the reverse sub-cooling control valve 6 in the direction of refrigerant flow would cause the internal pressure of the first pressure chamber 31 to be lower than the internal pressure of the second pressure chamber 32, causing the diaphragm 75 and the actuating rod 79 to be displaced downwardly in FIGS. 3 and 5. This in turn causes the degree of valve opening of the valve 69 in the reverse sub-cooling control valve 6 to be drivingly decreased, providing for a tendency to close the throttle hole 67. That is, the higher the level of subcooling (SC), the lower the degree of valve opening of the valve 69 in the reverse sub-cooling control valve 6 becomes, resulting in the amount of the refrigerant circulating through the refrigeration cycle to be reduced. Since this allows the amount of the refrigerant circulating through the refrigeration cycle to be optimized, the cooling performance is improved.

On the other hand, suppose that the amount of a refrigerant circulating through the refrigeration cycle is insufficient for a cooling load. In this case, an excessive level of superheating (SH) of the low pressure refrigerant that is delivered from the evaporator 7 and directed to the compressor 3 is provided, thereby causing a smaller amount of heat to be exchanged in the refrigerant-to-refrigerant heat exchanger 5. At this time, the level of subcooling (SC) is reduced upstream of the throttle hole 67 of the reverse sub-cooling control valve 6 in the direction of refrigerant flow.

Accordingly, a decrease in the level of the subcooling (SC) upstream of the throttle hole 67 of the reverse sub-cooling control valve 6 in the direction of refrigerant flow would cause the internal pressure of the first pressure chamber 31 to be higher than the internal pressure of the second pressure chamber 32, allowing the diaphragm 75 and the actuating rod 79 to be displaced upwardly in FIGS. 3 to 5. This in turn causes the degree of valve opening of the valve 69 in the reverse sub-cooling control valve 6 to be drivingly increased, providing for a tendency to open the throttle hole 67. That is, the lower the level of subcooling (SC), the higher the degree of valve opening of the valve 69 in the reverse sub-cooling control valve 6 becomes, resulting in a larger amount of the refrigerant circulating through the refrigeration cycle. This causes a lower level of the superheating (SH) at the outlet side of the evaporator 7, thereby providing an improved amount of heat to be exchanged between the high pressure refrigerant flowing through the inner first refrigerant heat exchange passageway 53 in the refrigerant-to-refrigerant heat exchanger 5 and the low pressure refrigerant flowing through the outer second refrigerant heat exchange passageway 54.

[Effects of First Embodiment]

As described above, the refrigeration cycle of the vehicle air conditioning system according to this embodiment allows the double-pipe refrigerant-to-refrigerant heat exchanger 5 to exchange heat between the high pressure liquid refrigerant delivered from the subcooler 47 of the sub-cooling condenser 4 to the evaporator 7 and the low pressure, liquid and gas two phase refrigerant to be delivered from the evaporator 7 to the compressor 3. This especially allows the level of the superheating (SH) and the degree of dryness on the outlet side of the evaporator 7, among other things in the performance of the evaporator 7, to be fed back to the level of the subcooling (SC) upstream of the throttle hole 67 of the reverse sub-cooling control valve 6. That is, the amount of the refrigerant circulating through the refrigeration cycle is adjusted in response to the level of subcooling (SC), thereby making it possible to indirectly control the level of the superheating (SH) and the degree of dryness on the outlet side of the evaporator 7. This provides an improvement in the air cooling performance of the evaporator 7, i.e., in the performance of cooling the passenger compartment.

Furthermore, since the reverse sub-cooling control valve 6 is designed such that only the state of the refrigerant upstream of the throttle hole 67 in the direction of refrigerant flow can be used to actuate the valve 69, the diaphragm 75, and the actuating rod 79, it is possible to provide a more simplified structure than that of the prior art temperature controlled expansion valve 104. The prior art temperature controlled expansion valve 104 is required to have a high pressure refrigerant passageway and a low pressure refrigerant passageway defined in the block. However, the reverse sub-cooling control valve 6 according to this embodiment is only required to have at least the high pressure refrigerant passageway 55 of the first refrigerant passageway 25 defined in the block joint 9 in order to actuate the reverse sub-cooling control valve 6. This is because the reverse sub-cooling control valve 6 has no temperature-sensitive cylinder 106 for sensing the level of the superheating (SH) on the outlet side of the evaporator 7. Furthermore, inserting the reverse sub-cooling control valve 6 into the high pressure refrigerant passageway 55 of the first refrigerant passageway 25 eliminates the necessity for an external sealing structure for preventing the leakage of refrigerant from the reverse sub-cooling control valve 6 to the outside, thereby providing a further simplified structure to the reverse sub-cooling control valve 6.

The temperature controlled expansion valve 104 is also designed to adjust the amount of the refrigerant circulating through the refrigeration cycle to thereby control the level of superheating (SH) on the outlet side of the evaporator 105. Accordingly, this requires a superheating region to be provided in the refrigerant evaporation passageway of the evaporator 105, making it difficult to make full use of the performance of the evaporator 105. However, the refrigeration cycle according to this embodiment makes it possible to arbitrarily adjust the state of the refrigerant on the outlet side of the evaporator 7 by the level of subcooling, which in turn makes it possible to provide an improvement in air-cooling performance to the evaporator 7, i.e., the performance of cooling the passenger compartment.

Furthermore, a certain degree of dryness can be provided to the refrigerant on the outlet side of the evaporator 7 as the level of subcooling (SC) decreases upstream of the throttle hole 67 of the reverse sub-cooling control valve 6. This allows a larger amount of heat to be exchanged between the high pressure liquid refrigerant delivered from the subcooler 47 of the sub-cooling condenser 4 to the evaporator 7 and the low pressure two phase liquid and gas refrigerant delivered from the evaporator 7 to the compressor 3. Accordingly, the high pressure refrigerant is readily subcooled by means of the low pressure refrigerant, allowing the low pressure refrigerant to be readily superheated by the high pressure refrigerant. This makes it possible to provide a higher level of subcooling (SC) upstream of the throttle hole 67 of the reverse sub-cooling control valve 6, thereby providing improvements both in the performance of the evaporator 7 and the amount of heat to be exchanged in the refrigerant-to-refrigerant heat exchanger 5.

Since a certain degree of dryness can be provided to the refrigerant on the outlet side of the evaporator 7 as the level of subcooling (SC) decreases upstream of the throttle hole 67 of the reverse sub-cooling control valve 6, noises produced in the compressor 3 are minimally transmitted to the evaporator 7, making it possible to prevent noises and vibrations from being transmitted from the evaporator 7 installed in the air conditioning casing 2 to the passenger compartment. Furthermore, the reverse sub-cooling control valve 6 is incorporated into the high-pressure refrigerant passageway 55 of the first refrigerant passageway 25 that is defined in the block joint 9 for connecting between the first refrigerant conduit 51 of the refrigerant-to-refrigerant heat exchanger 5 and the inlet pipe 35 of the evaporator 7. This provides an improvement in mounting the reverse sub-cooling control valve 6 to the vehicle when compared with the case of installing the reverse sub-cooling control valve 6 outside the block joint 9.

Furthermore, the reverse sub-cooling control valve 6 is connected downstream of the refrigerant-to-refrigerant heat exchanger 5 and upstream of the evaporator 7, thereby allowing the high pressure liquid refrigerant, having been subcooled in the refrigerant-to-refrigerant heat exchanger 5, to be supplied to the throttle hole 67 of the reverse sub-cooling control valve 6. Accordingly, noises produced in the reverse sub-cooling control valve 6 can be more readily prevented when compared with the case of a refrigerant in a combined liquid and gas phase being introduced into the throttle hole 67. Additionally, the high pressure refrigerant more readily produces a refrigerant in a dual phase of liquid and gas upon passing through the throttle hole 67 of the reverse sub-cooling control valve 6, thereby providing an improvement in the air cooling performance of the evaporator 7, i.e., the performance of cooling the passenger compartment.

In this embodiment, the first refrigerant conduit 51 and the second refrigerant conduit 52 in the refrigerant-to-refrigerant heat exchanger 5 are disposed in close proximity to each other so that heat can be exchanged between the refrigerants flowing therethrough. More specifically, the refrigerant-to-refrigerant heat exchanger 5 is designed as a double-pipe refrigerant-to-refrigerant heat exchanger with the first refrigerant conduit 51 having a circular cross section being surrounded by the second refrigerant conduit 52 having an annular cross section. Since this makes it possible to reduce the size of the refrigerant-to-refrigerant heat exchanger 5 and provide improvements in mounting the refrigerant-to-refrigerant heat exchanger 5 in position, the space for installing the refrigerant-to-refrigerant heat exchanger 5 can be reduced in the engine compartment of a vehicle such as an automobile.

[Configuration of Second Embodiment]

Figure 7:
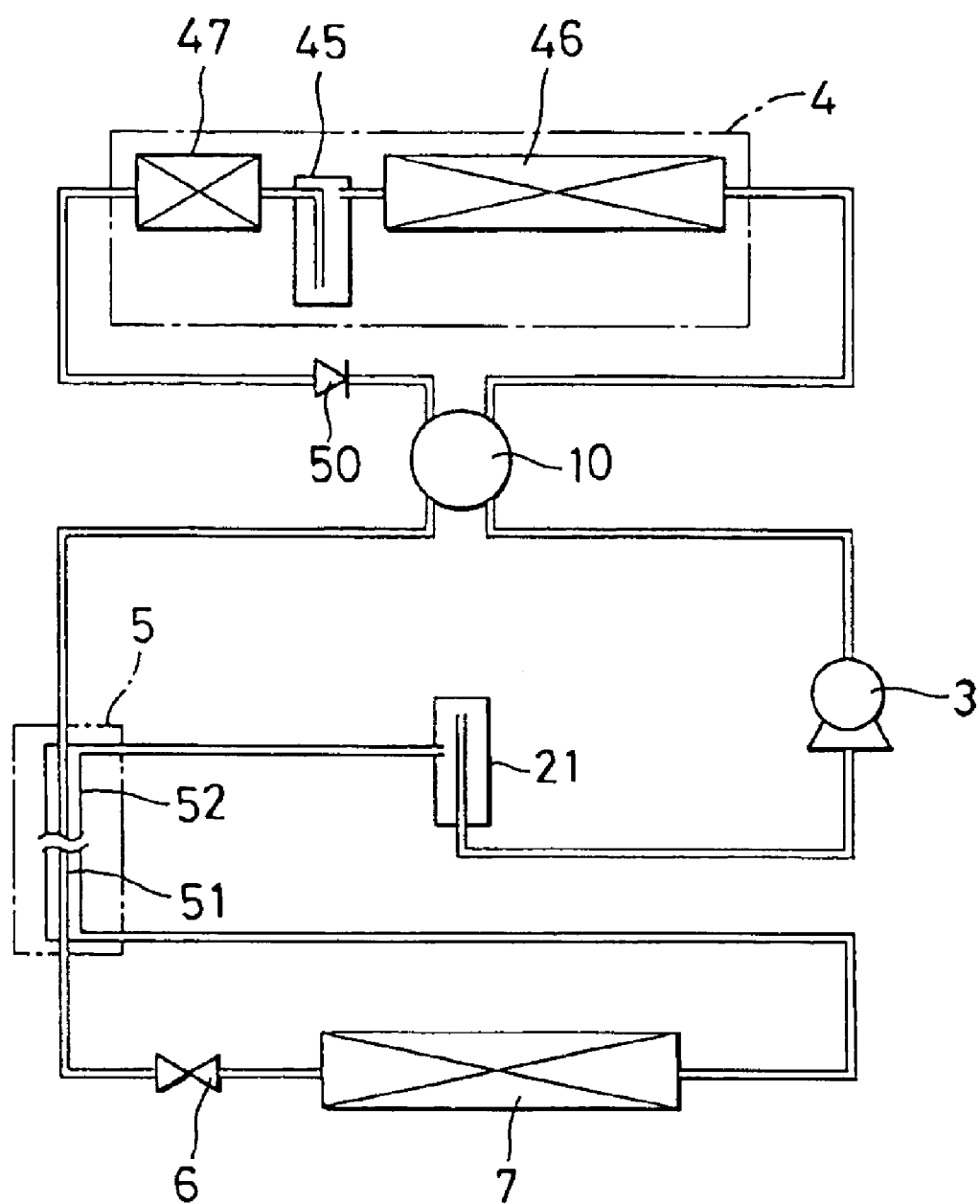
FIG. 7 is a diagram of the configuration of an air conditioning unit of a vehicle air conditioning system according to a second embodiment.
Figure 8:
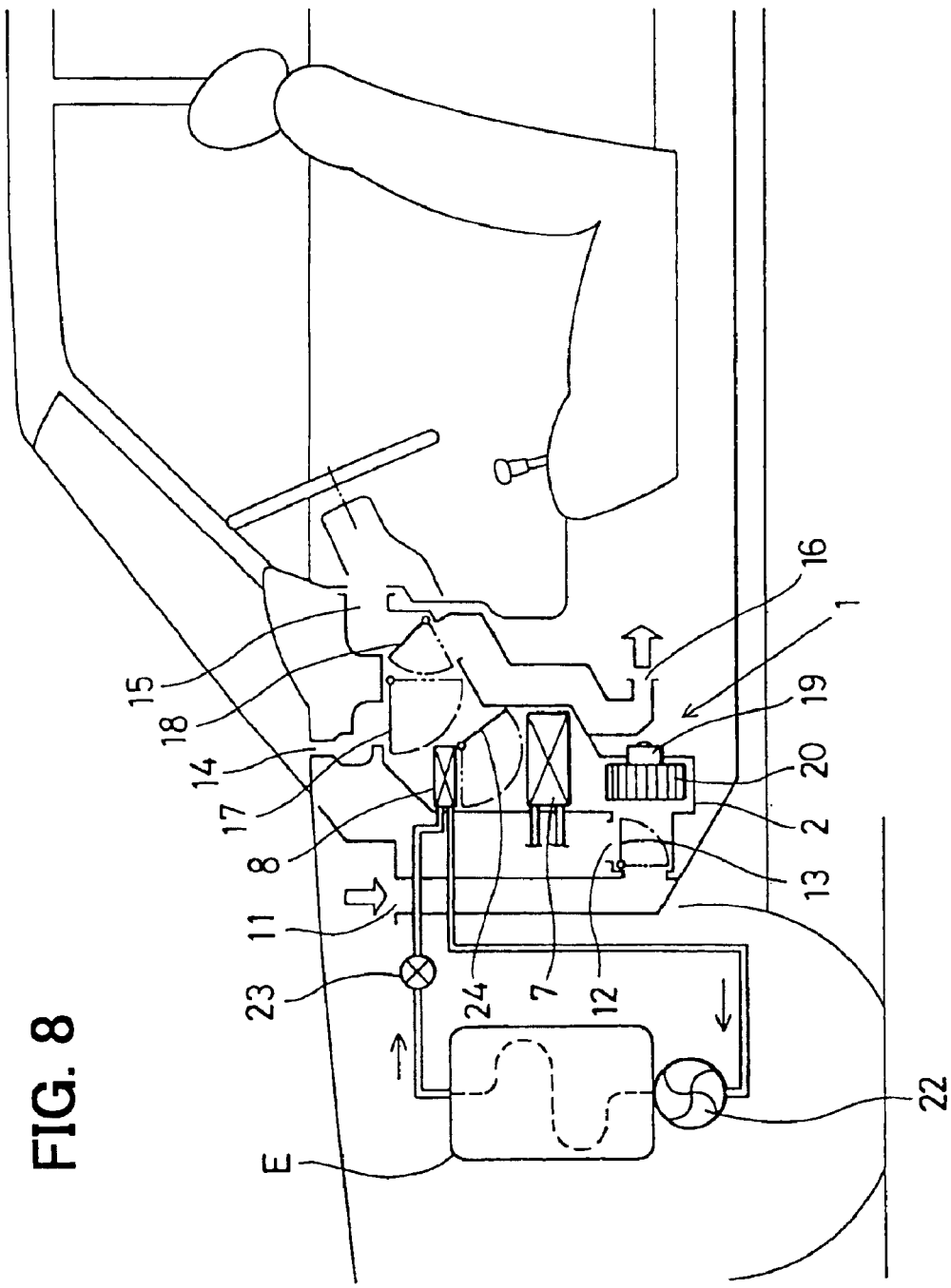
FIG. 8 is a diagram of the configuration of a refrigeration cycle of the vehicle air conditioning system according to the second embodiment.

FIGS. 7 and 8 illustrate a second embodiment of the present invention, FIG. 7 showing a refrigeration cycle of a vehicle air conditioning system, FIG. 8 showing an air conditioning unit of the vehicle air conditioning system.

The refrigeration cycle of the vehicle air conditioning system according to this embodiment comprises a normal cooling cycle, a hot gas cycle, and a switching electromagnetic valve 10 for switching between the normal cooling cycle and the hot gas cycle. A check valve 50 connects between a location downstream of the sub-cooling condenser 4 and a location upstream of the switching electromagnetic valve 10. The check valve 50 may also be integrally installed in the switching electromagnetic valve 10.

As used herein, the term "normal cooling cycle" refers to a refrigerant circuit (first refrigeration cycle) in which a high pressure gaseous refrigerant discharged from the discharge port of the compressor 3 is circulated through the sub-cooling condenser 4 (from the refrigerant condenser 46 through the receiver 45 to the subcooler 47), the first refrigerant conduit 51 in the refrigerant-to-refrigerant heat exchanger 5, the reverse sub-cooling control valve 6, the evaporator 7, the second refrigerant conduit 52 in the refrigerant-to-refrigerant heat exchanger 5, and an accumulator 21 back to the suction port of the compressor 3.

As used herein, the term "hot gas cycle" refers to a refrigerant circuit (second refrigeration cycle) in which a high pressure gaseous refrigerant discharged from the discharge port of the compressor 3 is allowed to bypass the sub-cooling condenser 4 and then circulate through the first refrigerant conduit 51 in the refrigerant-to-refrigerant heat exchanger 5, the reverse sub-cooling control valve 6, the evaporator 7, the second refrigerant conduit 52 in the refrigerant-to-refrigerant heat exchanger 5, the accumulator 21, and then back to the suction port of the compressor 3.

The switching electromagnetic valve 10 serves as a cycle switching means. The switching electromagnetic valve 10 switches the normal cooling cycle to the hot gas cycle when the temperatures of outside air, the engine cooling water, the air drawn into the evaporator 7, and the air immediately downstream of the evaporator 7 are lower than a predetermined value. For example, a switch occurs when the degree of opening of the air mix door 24 is at MAX and HOT.

Figure 9:
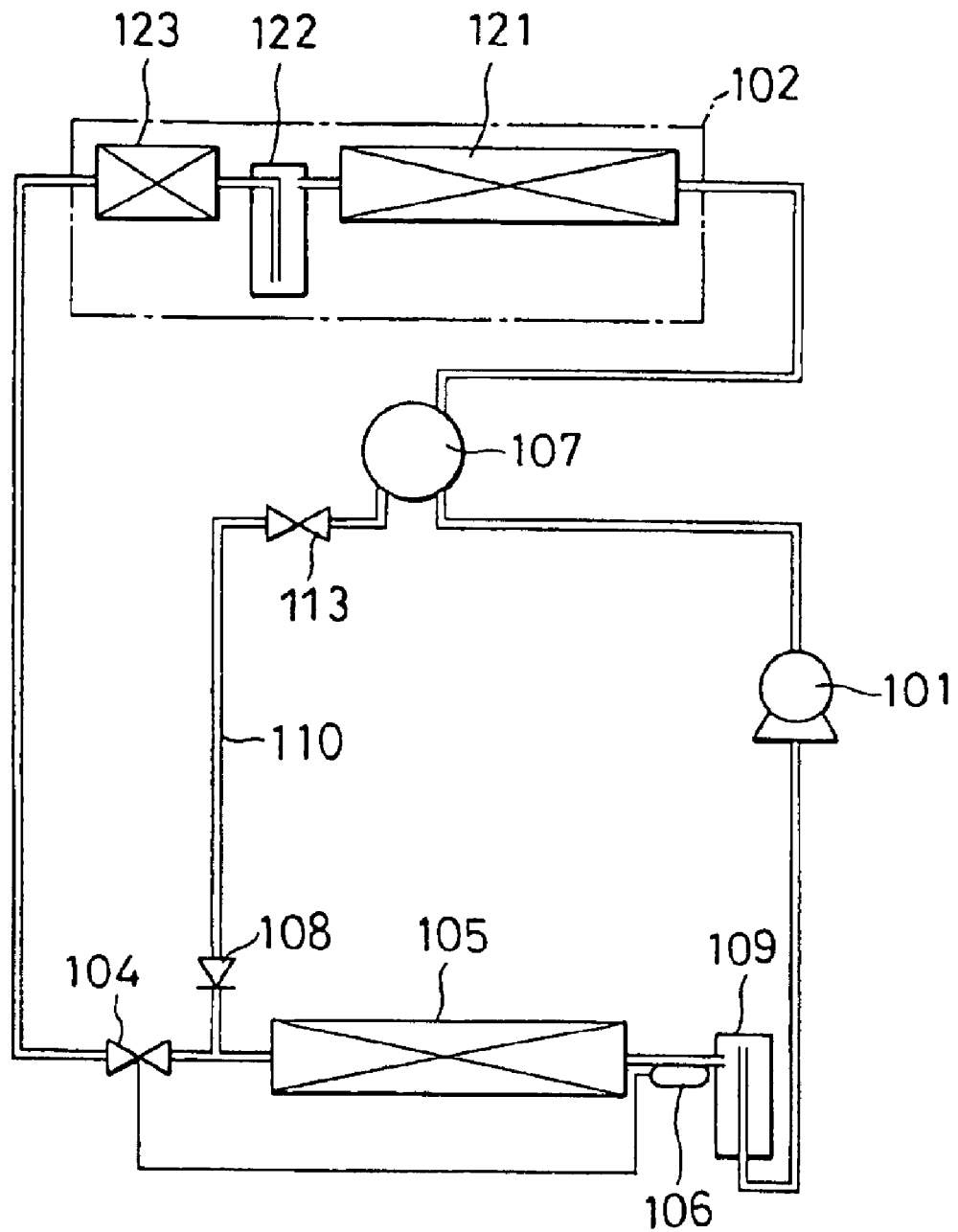
FIG. 9 is a diagram of the configuration of a refrigeration cycle of the vehicle air conditioning system according to a comparative example.
Figure 10A:
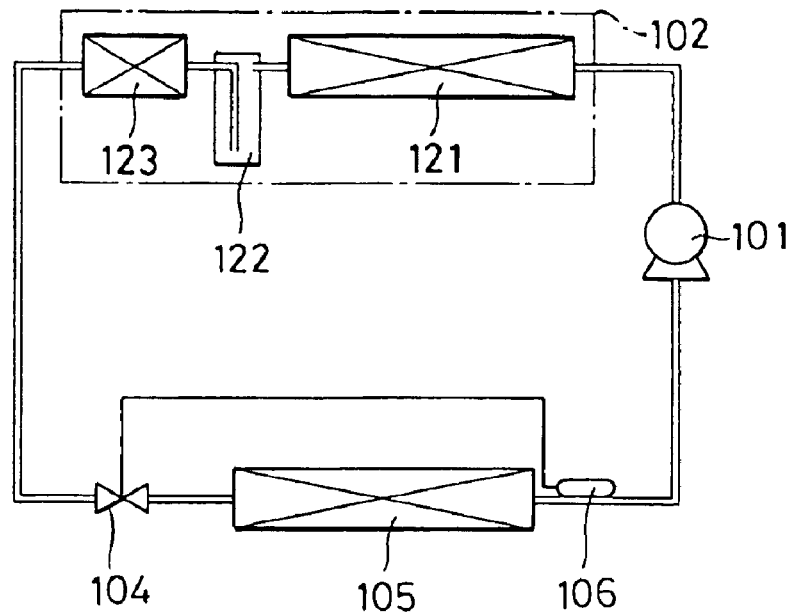
FIG. 10A is a diagram of the configuration of a prior art refrigeration cycle having a sub-cooling condenser.
Figure 10B:
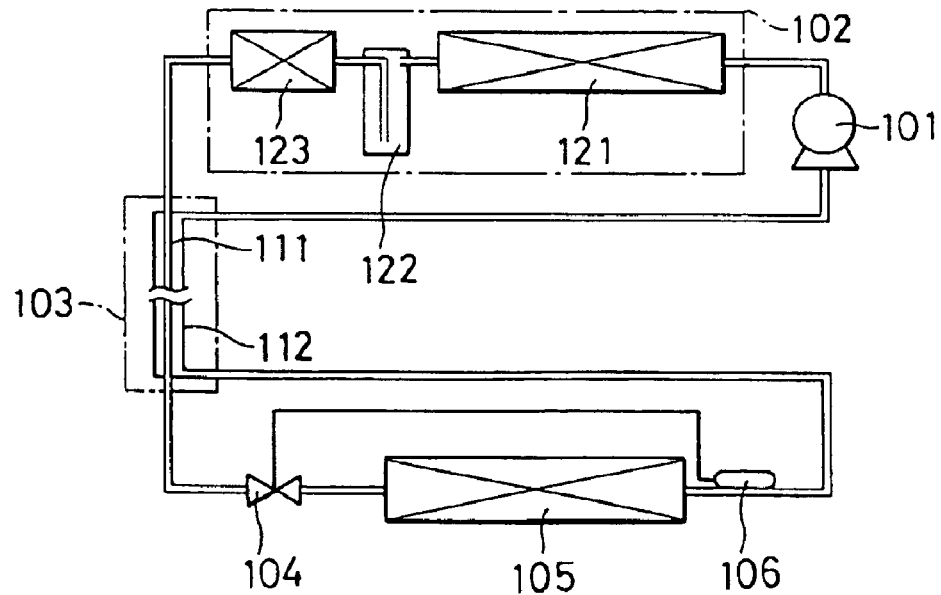
FIG. 10B is a diagram of the configuration of a prior art refrigeration cycle having a double-pipe refrigerant-to-refrigerant heat exchanger.

Now, FIG. 9 is a view illustrating a refrigeration cycle of the vehicle air conditioning system according to a comparative example. In this refrigeration cycle, installed area switching electromagnetic valve 107 for switching the normal cooling cycle to the hot gas cycle and the temperature controlled expansion valve 104. As the temperature controlled expansion valve 104, employed is a so-called block-type (box-type) expansion valve having the expansion valve body and the temperature-sensitive cylinder 106 incorporated in a cubic block. A check valve 108 and an accumulator 109 are also shown. An invariable throttle valve 113 has a diameter of about 2.5 mm, is disposed in a bypass conduit 110, and depressurizes the refrigerant directed to the evaporator 105 during the hot gas cycle. In this arrangement, the check valve 108 and the invariable throttle valve 113 may also be integrally installed in the switching electromagnetic valve 107.

[Features of Second Embodiment]

As shown in FIG. 7, for example, the passenger compartment of a vehicle such as an automobile is cooled as follows. That is, the system allows the inside/outside air switching door 13 to switch the suction port mode to the outside air drawing (FRS) mode for fully opening the outside air suction port 11 and for fully closing the inside air suction port 12. The system also allows the blowing opening switching doors 17, 18 to switch the blowing opening mode to the foot (FOOT) mode for fully opening the FOOT blowing opening 16 and for fully closing the DEF blowing opening 14 and the FACE blowing opening 15. At this time, the air mix door 24 is opened to a predetermined degree (e.g., MAX and HOT) to provide a blowing temperature responsive to the set point temperature that is set by a vehicle passenger.

On the other hand, switching the refrigeration cycle from the normal cooling cycle to the hot gas cycle by means of the switching electromagnetic valve 10 would cause a high-temperature high-pressure refrigerant discharged from the compressor 3 to bypass the sub-cooling condenser 4 and then flow through the first refrigerant conduit 51 of the refrigerant-to-refrigerant heat exchanger 5 and the throttle hole 67 of the reverse sub-cooling control valve 6 into the evaporator 7. Then, in the evaporator 7, heat is exchanged between the air flowing through the air conditioning casing 2 of the air conditioning unit 1 and the high-temperature high-pressure refrigerant to add heat to the air flowing through the air conditioning casing 2, thereby making it possible to enhance the heating capability of the hot-water heater 8 upon staring the engine or immediately after the engine has been started.

Furthermore, in the reverse sub-cooling control valve 6, the valve 69 is fully opened when a level of subcooling (SC) cannot be achieved upstream of the throttle hole 67 in the direction of refrigerant flow. Accordingly, even when the switching electromagnetic valve 10 switches the normal cooling cycle to the hot gas cycle to actuate the reverse sub-cooling control valve 6 (the level of subcooling=0° C.), it is not necessary to bypass the sub-cooling condenser 102 and the reverse sub-cooling control valve 6. This eliminates the bypass conduit 110 of FIG. 9 in the refrigeration cycle, thereby making it possible to simplify the structure of the refrigeration cycle. Here, it is to be understood that the valve hole of the reverse sub-cooling control valve 6 has the diameter (e.g., 24 mm), in its fully opened position, which is required during the hot gas cycle. As shown in FIG. 9, a typical receiver cycle requires the bypass conduit 110, which is inconveniently mounted to the vehicle and requires additional costs, however, these problems would not be raised in this embodiment.

[Other Embodiments]

In the aforementioned embodiment, the variable throttle valve is implemented with the reverse sub-cooling control valve 6 that provides a smaller area of opening or a lower degree of throttle opening to the throttle hole 67 or a smaller amount of lift to the valve 69 when a higher level of subcooling is provided or the level of subcooling is greater than a predetermined value. Likewise, the variable throttle valve implemented with the reverse sub-cooling control valve 6 provides a larger area of opening or a higher degree of throttle opening to the throttle hole 67 or a larger amount of lift to the valve 69 when a lower level of subcooling is provided or the level of subcooling is less than the predetermined value. However, it is also possible to employ an electric-motor-driven or electromagnetic flow rate control valve with a refrigerant temperature sensor means for sensing the level of subcooling or the temperature of refrigerant, which provides a smaller area of opening or a lower degree of throttle opening to the throttle hole 67 or a smaller amount of lift to the valve 69 when a higher level of subcooling or a higher temperature of refrigerant is sensed with the refrigerant temperature sensor means. Likewise, the device may provide a larger area of opening or a higher degree of throttle opening to the throttle hole 67 or a larger amount of lift to the valve 69 when a level of sub cooling or a lower temperature of refrigerant is sensed.

In the aforementioned embodiment, the outlet side of the sub-cooling condenser (a refrigerant condenser integrated with a liquid refrigerant receiver) 4, which integrates the refrigerant condenser 46, the receiver 45, and the subcooler 47, is connected to the inlet side of the first refrigerant conduit 51 of the refrigerant-to-refrigerant heat exchanger 5. However, it is also possible to connect between the outlet port of the receiver 45, which is separated from the refrigerant condenser 46 and the inlet side of the first refrigerant conduit 51 of the refrigerant-to-refrigerant heat exchanger 5. That is, the subcooler 47 may be eliminated because a high pressure refrigerant is subcooled in the first refrigerant conduit 51 of the refrigerant-to-refrigerant heat exchanger 5.

As the refrigerant-to-refrigerant heat exchanger, the aforementioned embodiment employs the double-pipe refrigerant-to-refrigerant heat exchanger 5 configured such that the outer circumferential surface of the first refrigerant conduit 51, through which a high pressure refrigerant delivered from the sub-cooling condenser 4 and directed to the evaporator 7 flows, is surrounded with the second refrigerant conduit 52, through which a low pressure refrigerant delivered from the evaporator 7 and directed to the compressor 3 flows. However, it is also possible to employ such a double-pipe refrigerant-to-refrigerant heat exchanger 5 configured such that the outer circumferential surface of the second refrigerant conduit 52, through which a low pressure refrigerant delivered from the evaporator 7 and directed to the compressor 3 flows, is surrounded with the first refrigerant conduit 51, through which a high pressure refrigerant delivered from the sub-cooling condenser 4 and directed to the evaporator 7 flows.

On the other hand, as the refrigerant-to-refrigerant heat exchanger, it is also possible to employ a double-layer refrigerant-to-refrigerant heat exchanger which allows one end face of the first refrigerant conduit 51 (a face opposite to the second refrigerant conduit 52) to closely contact with one end face of the second refrigerant conduit 52 (a face opposite to the first refrigerant conduit 51) so that heat can be exchanged between the refrigerants flowing therethrough. The first refrigerant conduit 51 and the second refrigerant conduit 52 may also be disposed adjacent to or in close proximity to each other so that heat can be exchanged between the refrigerants flowing therethrough.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A refrigeration cycle system comprising:
    a compressor for compressing and discharging a refrigerant;
    a condenser for condensing the refrigerant discharged from the refrigerant compressor to a liquid refrigerant;
    a liquid refrigerant receiver for separating the refrigerant delivered from the refrigerant condenser into a liquid refrigerant and a gaseous refrigerant and allowing only the liquid refrigerant to be delivered;
    a variable throttle valve defining a valve hole through which the liquid refrigerant delivered from the liquid refrigerant receiver passes;
    a valve body for adjusting an area of opening of the valve hole;
    a refrigerant evaporator for evaporating the refrigerant having been adiabatically expanded upon passing through the valve hole of the variable throttle valve; and
    a refrigerant-to-refrigerant heat exchanger for exchanging heat between a high pressure refrigerant delivered from said liquid refrigerant receiver and a low pressure refrigerant delivered from said refrigerant evaporator, wherein
    said variable throttle valve is actuated in response to a level of subcooling of a refrigerant detected at an outlet of said high pressure refrigerant of said refrigerant-to-refrigerant heat exchanger in a manner that said variable throttle valve reduces an area of opening or a degree of throttle opening of said valve hole or an amount of lift of said valve body as a level of subcooling of a refrigerant delivered from said refrigerant-to-refrigerant heat exchanger increases or has increased to a predetermined value or more, and
    said variable throttle valve increases the area of opening or the degree of throttle opening of said valve hole or the amount of lift of said valve body as the level of subcooling of the refrigerant delivered from said refrigerant-to-refrigerant heat exchanger decreases or has reduced to the predetermined value or less.

2. The refrigeration cycle system according to claim 1, wherein
    said variable throttle valve is disposed downstream of said refrigerant-to-refrigerant heat exchanger and upstream of said refrigerant evaporator.

3. The refrigeration cycle system according to claim 1, said refrigerant-to-refrigerant heat exchanger further comprising:
    a first refrigerant conduit through which a high pressure refrigerant delivered from said liquid refrigerant receiver and directed to said variable throttle valve flows and a second refrigerant conduit through which a low pressure refrigerant delivered from said refrigerant evaporator and directed to said refrigerant compressor flows.

4. The refrigeration cycle system according to claim 3, wherein
    said refrigerant-to-refrigerant heat exchanger is a double-pipe refrigerant-to-refrigerant heat exchanger with an outer circumferential surface of one of said first and second refrigerant conduits being surrounded with the other refrigerant conduit.

5. The refrigeration cycle system according to claim 3, wherein
    said refrigerant-to-refrigerant heat exchanger is a double-layer refrigerant-to-refrigerant heat exchanger with one end face of one of said first and second refrigerant conduits being in close contact with one end face of the other refrigerant conduit.

6. The refrigeration cycle system according to claim 3, further comprising:
    a pipe joint or a block for connecting between the first refrigerant conduit of said refrigerant-to-refrigerant heat exchanger and an inlet pipe of said refrigerant evaporator, wherein
    a high pressure refrigerant passageway, through which a high pressure refrigerant flows, is defined within said pipe joint or said block, and
    said variable throttle valve is incorporated in said high-pressure refrigerant passageway.

7. The refrigeration cycle system according to claim 3, wherein
    a high pressure refrigerant passageway through which a high pressure refrigerant flows is defined within said first refrigerant conduit of said refrigerant-to-refrigerant heat exchanger, and
    said variable throttle valve is incorporated in said high-pressure refrigerant passageway.

8. The refrigeration cycle system according to claim 3, said variable throttle valve further comprising:
    means for driving said valve body having a first pressure chamber in which a medium for converting a change in temperature of a refrigerant delivered from the first refrigerant conduit of said refrigerant-to-refrigerant heat exchanger to a pressure change is encapsulated, a second pressure chamber to which the refrigerant delivered from the first refrigerant conduit of said refrigerant-to-refrigerant heat exchanger exerts a high pressure, and a diaphragm to be displaced in response to a pressure difference between an internal pressure of said first pressure chamber and an internal pressure of said second pressure chamber, and means for biasing said valve body to a close position, said valve body drive means having a biasing force of said valve body bias means to drivingly close said valve body when a level of subcooling of a refrigerant introduced into the valve hole of said variable throttle valve increases and the internal pressure of said first pressure chamber is lower than the internal pressure of said second pressure chamber, and said valve body drive means drivingly opens said valve body against the biasing force of said valve body bias means when the level of subcooling of a refrigerant introduced into the valve hole of said variable throttle valve decreases and the internal pressure of said first pressure chamber is higher than the internal pressure of said second pressure chamber.

9. The refrigeration cycle system according to claim 3, further comprising:

an air conditioning unit for air-conditioning a passenger compartment of a vehicle, wherein said refrigerant evaporator for exchanging heat between a refrigerant drawn from said variable throttle valve and air, and a hot-water heater for exchanging heat between cooling water for cooling an engine and air are disposed within an air conditioning casing of said air conditioning unit.

10. The refrigeration cycle system according to claim 9, further comprising:

a first refrigeration cycle allowing a refrigerant discharged from said refrigerant compressor to pass through said condenser and said liquid refrigerant receiver and thereafter return through the first refrigerant conduit of said refrigerant-to-refrigerant heat exchanger, said variable throttle valve, said refrigerant evaporator, and said second refrigerant conduit of said refrigerant-to-refrigerant heat exchanger to said refrigerant compressor, a second refrigeration cycle allowing a refrigerant discharged from said refrigerant compressor to bypass said refrigerant condenser and said liquid refrigerant receiver and thereafter return through the first refrigerant conduit of said refrigerant-to-refrigerant heat exchanger, said variable throttle valve, said refrigerant evaporator, and said second refrigerant conduit of said refrigerant-to-refrigerant heat exchanger to said refrigerant compressor, and cycle switching means for switching between said first refrigeration cycle and said second refrigeration cycle.

11. The refrigeration cycle system according to claim 1, further comprising:

a subcooling detecting member disposed in a refrigerant passage between said outlet of said high pressure refrigerant of said refrigerant-to-refrigerant heat exchanger and said valve hole, the subcooling detecting member being formed to generate a mechanical displacement in response to a detected subcooling and to transmit the mechanical displacement to said valve body.

12. The refrigeration cycle system according to claim 11, wherein said subcooling detecting member includes:

a diaphragm casing disposed in said refrigerant passage;

a diaphragm attached on the diaphragm casing, the diaphragm defining a pressure chamber with said diaphragm casing, and the diaphragm having a movable portion on which the mechanical displacement is obtained by a pressure of gas in said pressure chamber which is responsive to the subcooling; and an actuating member disposed between said diaphragm and said valve body to actuate the valve body in response to the mechanical displacement.

13. A refrigeration cycle system comprising:

a compressor for compressing and discharging a refrigerant;

a condenser for condensing the refrigerant discharged from the refrigerant compressor to a liquid refrigerant;

a liquid refrigerant receiver for separating the refrigerant delivered from the refrigerant condenser into a liquid refrigerant and a gaseous refrigerant and allowing only the liquid refrigerant to be delivered;

a variable throttle valve defining a valve hole through which the liquid refrigerant delivered from the liquid refrigerant receiver passes;

a valve body for adjusting an area of opening of the valve hole;

a refrigerant evaporator for evaporating the refrigerant having been adiabatically expanded upon passing through the valve hole of the variable throttle valve; and a refrigerant-to-refrigerant heat exchanger for exchanging heat between a high pressure refrigerant delivered from said liquid refrigerant receiver and a low pressure refrigerant delivered from said refrigerant evaporator, wherein said variable throttle valve reduces an area of opening or a degree of throttle opening of said valve hole or an amount of lift of said valve body as a level of subcooling of a refrigerant delivered from said refrigerant-to-refrigerant heat exchanger increases or has increased to a predetermined value or more, and said variable throttle valve increases the area of opening or the degree of throttle opening of said valve hole or the amount of lift of said valve body as the level of subcooling of the refrigerant delivered from said refrigerant-to-refrigerant heat exchanger decreases or has reduced to the predetermined value or less, and wherein said refrigerant-to-refrigerant heat exchanger comprises:

a first refrigerant conduit through which a high pressure refrigerant delivered from said liquid refrigerant receiver and directed to said variable throttle valve flows; and a second refrigerant conduit through which a low pressure refrigerant delivered from said refrigerant evaporator and directed to said refrigerant compressor flows, and wherein said variable throttle valve further comprises:

means for driving said valve body having a first pressure chamber in which a medium for converting a change in temperature of a refrigerant delivered from the first refrigerant conduit of said refrigerant-to-refrigerant heat exchanger to a pressure change is encapsulated, a second pressure chamber to which the refrigerant delivered from the first refrigerant conduit of said refrigerant-to-refrigerant heat exchanger exerts a high pressure, and a diaphragm to be displaced in response to a pressure difference between an internal pressure of said first pressure chamber and an internal pressure of said second pressure chamber; and means for biasing said valve body to a close position, said valve body drive means having a biasing force of said valve body bias means to drivingly close said valve body when a level of subcooling of a refrigerant introduced into the valve hole of said variable throttle valve increases and the internal pressure of said first pressure chamber is lower than the internal pressure of said second pressure chamber, wherein said valve body drive means drivingly opens said valve body against the biasing force of said valve body bias means when the level of subcooling of a refrigerant introduced into the valve hole of said variable throttle valve decreases and the internal pressure of said first pressure chamber is higher than the internal pressure of said second pressure chamber.

14. A refrigeration cycle component provided between an evaporator and a refrigerant-to-refrigerant heat exchanger for exchanging heat between a high pressure refrigerant supplied to the evaporator and a low pressure refrigerant returned from the evaporator, the component comprising:

a member defining a high pressure passageway through which the high pressure refrigerant flows and a low pressure passage way through which the low pressure refrigerant flows; and a subcooling control valve including:

a valve body movably supported in the high pressure passageway in a manner that the valve body varies an opening area of the high pressure passageway in accordance with a displacement of the valve body; and a subcooling detecting member disposed in the high pressure passageway upstream the valve body, the subcooling detecting member being formed to generate a mechanical displacement in response to a subcooling detected from the refrigerant in the high pressure refrigerant passageway and to transmit the mechanical displacement to the valve body so that the valve body narrows the opening area of the high pressure passageway as the level of the subcooling increases.

15. The refrigeration cycle component according to claim 14, wherein the member is a block joint for providing passageways between the refrigerant-to-refrigerant heat exchanger and the evaporator.

16. The refrigeration cycle component according to claim 15, wherein the refrigerant-to-refrigerant heat exchanger has a double tube structure, and the member is the block joint disposed on an end of the refrigerant-to-refrigerant heat exchanger.

17. The refrigeration cycle component according to claim 16, wherein refrigerant-to-refrigerant heat exchanger has an inner tube in which a conduit for the high pressure refrigerant is provided, and an outer tube defining a gap outside the inner tube, the gap providing a conduit for the low pressure refrigerant.

18. The refrigeration cycle component according to claim 16, wherein the block joint is an elbow to form the passageways in an L-shape.

19. The refrigeration cycle component according to claim 16, wherein the subcooling detecting member includes:

a diaphragm casing disposed in the high pressure refrigerant passageway;

a diaphragm attached on the diaphragm casing, the diaphragm defining a pressure chamber with said diaphragm casing, and the diaphragm having a movable portion on which the mechanical displacement is obtained by a pressure of gas in the pressure chamber which is responsive to the subcooling; and an actuating member disposed between the diaphragm and the valve body to actuate the valve body in response to the mechanical displacement.

* * * * *